US012460218B2

United States Patent
Chen et al.

(10) Patent No.: US 12,460,218 B2
(45) Date of Patent: Nov. 4, 2025

(54) **PARTHENOGENETIC HAPLOID INDUCTION GENE *DMP* AND APPLICATION THEREOF**

(71) Applicant: CHINA AGRICULTURAL UNIVERSITY, Beijing (CN)

(72) Inventors: Shaojiang Chen, Beijing (CN); Yu Zhong, Beijing (CN); Chenxu Liu, Beijing (CN); Xiaolong Qi, Beijing (CN); Mengran Li, Beijing (CN); Baojian Chen, Beijing (CN); Yanyan Jiao, Beijing (CN); Zongkai Liu, Beijing (CN)

(73) Assignee: CHINA AGRICULTURAL UNIVERSITY, Beijing (CN)

( * ) Notice: Subject to any disclaimer, the term of this patent is extended or adjusted under 35 U.S.C. 154(b) by 722 days.

(21) Appl. No.: 17/595,768

(22) PCT Filed: Jul. 1, 2020

(86) PCT No.: PCT/CN2020/099680
§ 371 (c)(1),
(2) Date: Nov. 23, 2021

(87) PCT Pub. No.: WO2020/239137
PCT Pub. Date: Dec. 3, 2020

(65) Prior Publication Data
US 2022/0403400 A1    Dec. 22, 2022

(30) Foreign Application Priority Data
May 27, 2019  (CN) .......................... 201910445082.3

(51) Int. Cl.
*C12N 15/82* (2006.01)
(52) U.S. Cl.
CPC ..... *C12N 15/8213* (2013.01); *C12N 15/8218* (2013.01); *C12N 15/8287* (2013.01); *C12N 2310/20* (2017.05)
(58) Field of Classification Search
None
See application file for complete search history.

(56) References Cited

PUBLICATIONS

Zhong et al (2019 Nature Plants 5:575-580 (Year: 2019).*
Cyprys et al 2019 Nature Plants 5:253-257 (provided by Applicant) (Year: 2019).*
Theologis, A. et al. "*Arabidopsis thaliana* transmembrane protein, putative (DUF679) (AT1G091), mRNA" Nucleotide; Accession No. NM_001035933.2; GenBank, Feb. 14, 2019; 2 pgs.
Tabata, S. et al. "*Arabidopsis thaliana* transmembrane protein, putative (DUF679) (DAU2), mRNA" Nucleotide; Accession No. NM_123327.2 GenBank, Feb. 14, 2019; 2 pgs.
"Predicted: Solanum lycopersicum protein DMP8-like (LOC101263909), mRNA" Nucleotide; Accession No. XM_004239348. 3; GenBank, Aug. 8, 2018; 2 pgs.
Cyprys, Philipp et al. "Gamete fusion is facilitated by two sperm cell-expressed DUF679 membrane proteins" Nature Plants, vol. 5, No. 3, Mar. 8, 2019, pp. 253-257.
International Search Report issued in International Application No. PCT/CN2020/099680; mailed Oct. 13, 2020; 110 pgs.

* cited by examiner

*Primary Examiner* — Brent T Page
(74) *Attorney, Agent, or Firm* — HAUPTMAN HAM, LLP

(57) ABSTRACT

Provided are a parthenogenetic haploid induction gene DMP and an application thereof. The parthenogenetic haploid induction genes AtDMP8 and AtDMP9 are cloned from *Arabidopsis thaliana*. Experiments have shown that mutations of AtDMP8 and AtDMP9 can produce parthenogenetic haploid inducibility, to enable dicotyledonous crops to be induced to produce haploids via parthenogenetic means. The present invention was further verified in tomatoes, and it was also found in tomatoes that the mutation of SlDMP can produce parthenogenetic haploid inducibility. The invention lays an important foundation for broadening the application of haploid breeding technology on dicotyledonous plants and revealing the biological mechanism of parthenogenetic haploid production. Given the universality of the utilization of haploid breeding technology in the current breeding industry, the invention has very wide application space and market prospects.

8 Claims, 4 Drawing Sheets
Specification includes a Sequence Listing.

FIG. 6A
FIG. 6B
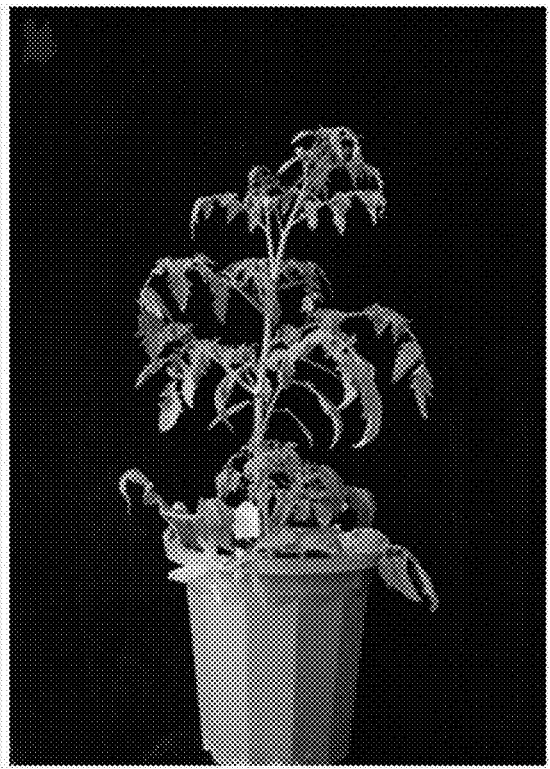
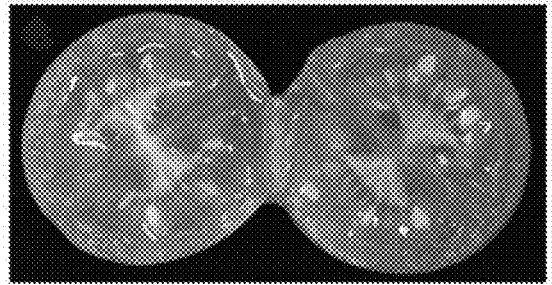
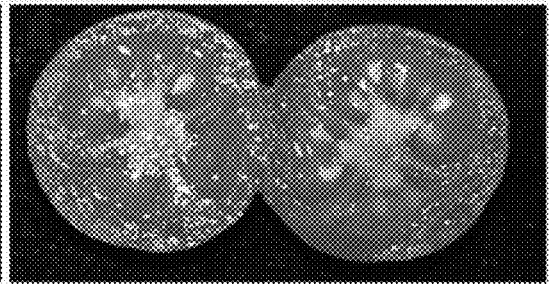
FIG. 6C
FIG. 6D

FIG. 7A
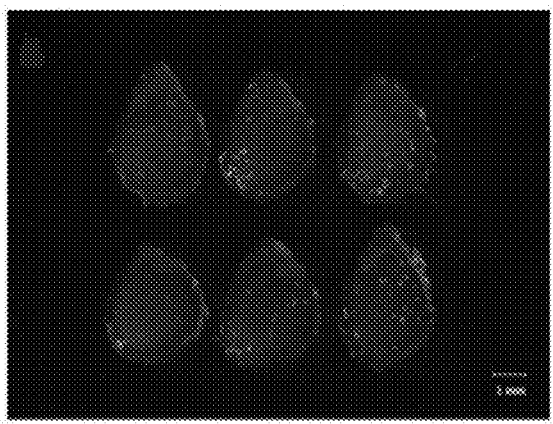
FIG. 7B
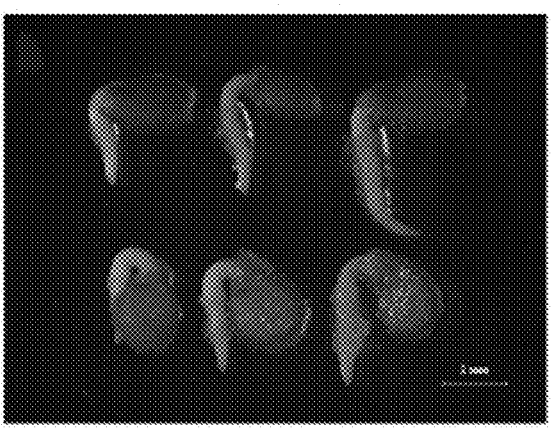
FIG. 7C
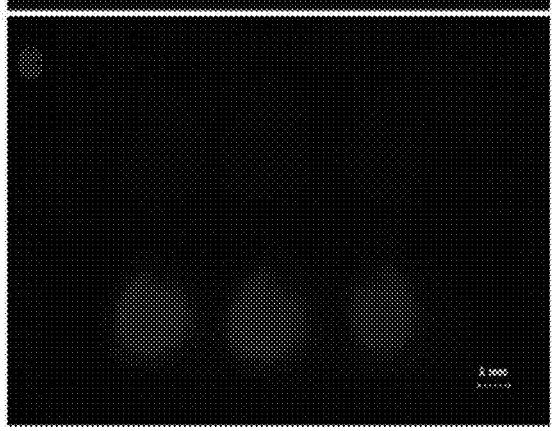
FIG. 7D
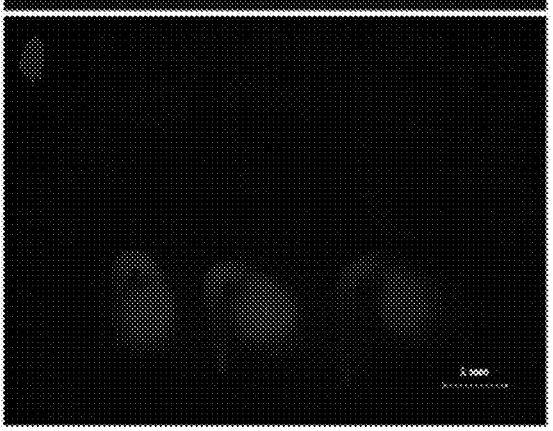
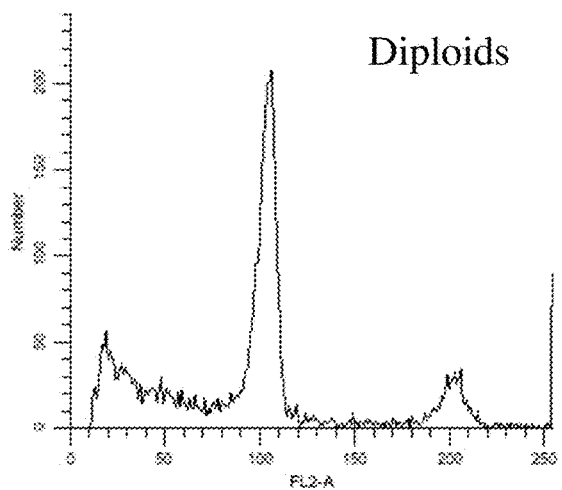
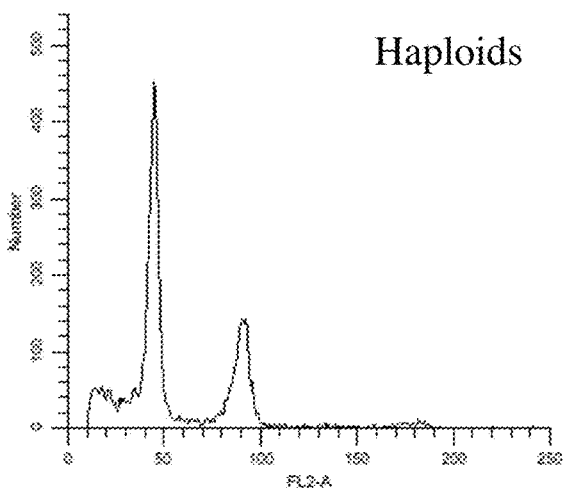
FIG. 8

PARTHENOGENETIC HAPLOID INDUCTION GENE *DMP* AND APPLICATION THEREOF

RELATED APPLICATIONS

The present application is a U.S. National Phase of International Application Number PCT/CN2020/099680 filed Jul. 1, 2020, and claims priority to Chinese Application Number 201910445082.3 filed May 27, 2019.

INCORPORATION BY REFERENCE

The sequence listing provided in the file entitled Sequence_List_v2.txt, which is an ASCII text file that was created on Jul. 12, 2022, and which comprises 52,091 bytes, is hereby incorporated by reference in its entirety.

TECHNICAL FIELD

The present invention relates to the field of agricultural biotechnology and crop genetic breeding based on genome editing technology, in particular to a preparation method of a plant maternal haploid inducer line and application thereof, in particular to an application of a parthenogenetic haploid induction gene DMP mutant obtained by using a gene-editing technology as a plant haploid inducer line in inducing a plant to generate a maternal haploid.

BACKGROUND

The breeding of elite selfed lines is the basis and key for breeding the elite hybrid by utilizing the heterosis of the crops. However, the acquisition of a more stable selfed line requires 7-8 generations by traditional breeding methods, and only 2 generations by haploid breeding technique (Weber D F, 2014), which greatly shortens the breeding cycle. At present, the technique of in vitro anther culture is the most favorite to incite the production of haploid on dicotyledonous crops, which has the disadvantages of low efficiency, high dependence on the genotype of materials, and difficulty in large-scale application. Although the introduction of the genetically modified centromere-specific histone CENH3 variant into the *Arabidopsis thaliana* cenh3 mutant induces haploid production, this approach produces a large number of euploids during induction (Ravi, M, et al, 2010).

At present, the gene-editing technology system has been very mature and stable, but it cannot further exert its maximum effect due to the limitation of genetic transformation on the dependence of material and genotype. Although editing can be achieved by introducing the gene-editing vector into some readily transformable recipient material and further hybridizing it to the target to be edited (Li C et al., 2017), it takes a long time to backcross to restore the background and cannot reach 100%. Haploid induction and gene-editing techniques are combined to achieve editing of target material haploid genes to obtain homozygous editing lines, which greatly shorten and widen the application range of haploid and gene-editing techniques (Kelliher, T et al., 2019; Wang, B et al., 2019; Hu, N et al., 2019). However, in dicotyledonous plants, haploid induction cannot be combined with gene-editing techniques due to the lack of the way of generation of a haploid by biological induction.

SUMMARY

An objective of the present invention is to provide a method for preparing a plant haploid inducer line.

The preparation method of the plant haploid inducer line provided by the invention is as follows A1) or A2):

A1) silencing or inhibiting the expression and/or activity of the gene DMP in the plant genome or knocking out the gene DMP to obtain a plant haploid inducer line;

A2) inhibiting the activity of protein DMP in the plant to obtain a plant haploid inducer line; the plant is dicotyledonous;

the protein DMP is a protein represented by the following B1) or B2) or B3) or B4):

B1) a protein with the amino acid sequence shown in SEQ ID No. 2 or SEQ ID No. 4 or SEQ ID No. 6;

B2) a fusion protein obtained by attaching a tag to the N-terminus and/or C-terminus of the protein shown in SEQ ID No. 2 or SEQ ID No. 4 or SEQ ID No. 6;

B3) a protein having the same function obtained by substituting and/or deleting and/or adding one or several amino acid residues to the amino acid sequence shown in SEQ ID No. 2 or SEQ ID No. 4 or SEQ ID No. 6;

B4) a protein having 75% or more homology with the amino acid sequence shown in SEQ ID No. 2 or SEQ ID No. 4 or SEQ ID No. 6 and having the same function;

the DMP protein has the following functions: the dicotyledonous plant becomes a plant haploid inducer line when the protein DMP activity is inhibited therein. The protein DMP activity is inhibited such that the protein DMP is not expressed or is inactive.

The tag in the above-mentioned B2) refers to a polypeptide or a protein expressed by fusion with a protein of interest using DNA in vitro recombination technology to facilitate expression, detection, tracking, and/or purification of the protein of interest. The protein tag may be a Flag tag, a His-tag, an MBP tag, an HA tag, a Myc tag, a GST tag, and/or a SUMO tag.

The substitution and/or deletion and/or addition of one or several amino acid residues in the above-mentioned B3) is a substitution and/or deletion and/or addition of no more than 10 amino acid residues.

The homology of 75% or more in the above-mentioned B4) maybe 80%, 85%, 90%, or 95% or more.

According to the preparation method of the plant haploid inducer line, the gene DMP is the gene shown in the following C1) or C2) or C3) or C4):

C1) a cDNA molecule or a genomic DNA molecule shown in SEQ ID No. 1 or SEQ ID No. 3 or SEQ ID No. 5;

C2) a cDNA molecule or a genomic DNA molecule having 75% or more identity to the nucleotide sequence defined by C1);

C3) a cDNA molecule or a genomic DNA molecule derived from a dicotyledonous plant and having 75% or more identity to the nucleotide sequence defined in C1);

C4) a cDNA molecule or a genomic DNA molecule that hybridizes with a nucleotide sequence defined by C1) or C2) or C3) under stringent conditions;

The DMP gene has the following functions: the dicotyledonous plant becomes a plant haploid inducer line when the DMP gene is silenced or inhibited or knocked out therein.

The term "identity" as used herein refers to sequence similarity to a native nucleic acid sequence. "Identity" includes nucleotide sequences having 75% or more, or 85% or more, or 90% or more, or 95% or more identity to the nucleotide sequence encoding a protein consisting of the amino acid sequence shown in SEQ ID No.2 or SEQ ID No.4 or SEQ ID No.6 of the present invention. Identity can be assessed with the naked eye or by computer software. With computer software, identity between two or more sequences can be expressed as a percentage (%) that can be used to assess identity between related sequences.

In the preparation method of the plant haploid inducer line, the method for silencing or inhibiting the expression and/or activity of gene DMP or knocking out gene DMP in the plant genome comprises reducing the expression amount of gene DMP in the plant genome or subjecting gene DMP in the plant genome to deletion mutation or insertion mutation or base substitution.

Furthermore, when the dicotyledonous plant is *Arabidopsis thaliana*, gene DMP is gene AtDMP8 and/or gene AtDMP9; protein DMP is protein AtDMP8 and/or protein AtDMP9; the method comprises silencing or inhibiting the expression and/or activity of gene AtDMP8 and/or gene AtDMP9 in the *Arabidopsis thaliana* genome or knocking out gene AtDMP8 and/or gene AtDMP9 or inhibiting the activity of protein AtDMP8 and/or protein AtDMP8 to obtain the *Arabidopsis thaliana* haploid inducer line.

When the dicotyledonous plant is tomato, the gene DMP is gene SlDMP; the DMP protein is protein SlDMP; the method comprises silencing or inhibiting gene SlDMP or knocking out gene SlDMP or inhibiting the activity of protein SlDMP in the tomato genome to obtain a tomato haploid inducer line.

Still furthermore, the silencing or inhibiting the expression and/or activity of gene AtDMP8 and/or gene AtDMP9 in the *Arabidopsis thaliana* genome or knocking out gene AtDMP8 and/or gene AtDMP9 comprises reducing the expression of gene AtDMP8 and/or gene AtDMP9 in the *Arabidopsis thaliana* genome or subjecting the gene AtDMP8 and/or gene AtDMP9 in the *Arabidopsis thaliana* genome to deletion mutation or insertion mutation or base substitution.

The silencing or inhibiting the expression and/or activity of gene SlDMP in the tomato genome or knocking out gene SlDMP comprises reducing the expression amount of gene SlDMP in the tomato genome or subjecting gene SlDMP in the tomato genome to deletion mutation or insertion mutation or base substitution.

The method of reducing gene DMP expression in the plant genome comprises RNAi interference. The RNAi interference involves single stranded RNA interference, such as miRNA, or double-stranded RNA interference, such as siRNA, dsRNA, shRNA, etc.

The method of subjecting the gene DMP in the plant genome to deletion mutation or insertion mutation or base substitution comprises CRISPR/Cas9 or TELLEN or T-DNA insertion or EMS mutagenesis.

Furthermore, the method of subjecting the gene DMP in the plant genome to deletion mutation or insertion mutation, or base substitution comprises CRISPR/Cas9. The method of subjecting the gene DMP in the plant genome to deletion mutation or insertion mutation or base substitution comprises the following steps: introducing a CRISPR/Cas9 vector containing the target sequence into a plant to obtain a plant haploid inducer line.

In a specific example of the present invention, when the dicotyledonous plant is *Arabidopsis thaliana*, the target sequence of CRISPR/Cas9 is at positions 98-117 of SEQ ID No. 1, positions 290-309 of SEQ ID No. 3, positions 368-387 of SEQ ID No. 3, and positions 509-528 of SEQ ID No. 1. The CRISPR/Cas9 vector containing the target sequence is a recombinant vector obtained by connecting a DNA molecule represented by SEQ ID No. 7 (sgRNA expression element), a DNA molecule represented by SEQ ID No. 9 (Cas9 expression element), and a DNA molecule represented by SEQ ID No. 10 (fluorescent protein expression element) to a pICSL4723 vector through a golden gate method.

In a specific example of the present invention, when the dicotyledonous plant is tomato, the target sequences of CRISPR/Cas9 are at positions 76-95 of SEQ ID No. 5 and positions 247-266 of SEQ ID No. 5. The CRISPR/Cas9 vector containing the target sequence is a recombinant vector obtained by connecting a DNA molecule represented by SEQ ID No. 8 (sgRNA expression element), a DNA molecule represented by SEQ ID No. 11 (Cas9 expression element), a DNA molecule represented by SEQ ID No. 10 (fluorescent protein expression element), and a DNA molecule represented by SEQ ID No. 12 (NptII expression element) to a pICSL4723 vector through a golden gate method.

Another object of the present invention is to provide a method for preparing a plant haploid inducer line, comprising the step of selfing the plant haploid inducer line for at least one time, particularly for one time.

The preparation method of the plant haploid inducer line further comprises the step of screening gene DMP mutants. The gene DMP mutant is a plant with gene DMP mutation, and the gene DMP mutant is a gene DMP heterozygous mutant or a gene DMP homozygous mutant.

According to the preparation method of the plant haploid inducer line, the plant haploid inducer line specifically comprises an *Arabidopsis thaliana* mutant line T1-34, an *Arabidopsis thaliana* mutant line T1-6, an *Arabidopsis thaliana* mutant line T1-11, an *Arabidopsis thaliana* mutant line T1-19, an *Arabidopsis thaliana* mutant line T1-24, an *Arabidopsis thaliana* mutant line T1-25, an *Arabidopsis thaliana* mutant line T1-28, an *Arabidopsis thaliana* mutant line T1-32, an *Arabidopsis thaliana* mutant line T2-33, an *Arabidopsis thaliana* mutant line T2-38, a tomato mutant line sldmp-1 or a tomato mutant line sldmp-2; the difference between the genomic DNA of the *Arabidopsis thaliana* mutant line T1-34 and the genomic DNA of the wild-type *Arabidopsis thaliana* Col-0 only lies in that in a gene encoding protein AtDMP8, a fragment deletion occurs in one chromosome at positions 115-512 of SEQ ID No. 1, and a base (T) insertion occurs in the other chromosome at positions 114-115 of SEQ ID No. 1;

the difference between the genomic DNA of the *Arabidopsis thaliana* mutant line T1-6 and the genomic DNA of the wild-type *Arabidopsis thaliana* Col-0 only lies in that in a gene encoding protein AtDMP8, a fragment deletion occurs in one chromosome at positions 115-512 of SEQ ID No. 1, and a fragment deletion occurs in the other chromosome at positions 113-114 of SEQ ID No. 1; and in a gene encoding protein AtDMP9, a fragment insertion occurs in both chromosomes at positions 160-161 of SEQ ID No. 3, with the nucleotide sequence of the inserted fragment shown as SEQ ID No. 13;

the difference between the genomic DNA of the *Arabidopsis thaliana* mutant line T1-11 and the genomic DNA of the wild-type *Arabidopsis thaliana* Col-0 only lies in that in a gene encoding protein AtDMP8, a base (T) insertion occurs at positions 114-115 of SEQ ID No. 1, and in a gene encoding protein AtDMP9, a base (T) insertion occurs in one chromosome at positions 160-161 of SEQ ID No. 3, and a fragment insertion occurs in the other chromosome at positions 160-161 of SEQ ID No. 3, with the nucleotide sequence of the inserted fragment shown as SEQ ID No. 13;

the difference between the genome of the *Arabidopsis thaliana* mutant line T1-19 and the genome of the wild-type *Arabidopsis thaliana* Col-0 only lies in that in a gene encoding protein AtDMP8, a base (T) deletion occurs in one chromosome at position 114 of SEQ ID No. 1, and a fragment deletion occurs in the other chromosome at positions 115-511 of SEQ ID No. 1, and in a gene encoding protein AtDMP9, a fragment deletion occurs in one chromosome at positions 161-560 of SEQ ID No. 3, and a fragment deletion occurs in the other chromosome at positions 161-564 of SEQ ID No. 3;

the difference between the genomic DNA of the *Arabidopsis thaliana* mutant line T1-24 and the genomic DNA of the wild-type *Arabidopsis thaliana* Col-0 only lies in that in a gene encoding protein AtDMP8, a fragment deletion occurs in one chromosome at positions 115-512 of SEQ ID No. 1, and a base (T) insertion occurs in the other chromosome at positions 114-115 of SEQ ID No. 1, and in a gene encoding protein AtDMP9, a fragment deletion occurs in one chromosome at positions 161-560 of SEQ ID No. 3, and a fragment deletion occurs in the other chromosome at positions 159-160 of SEQ ID No. 3;

the difference between the genomic DNA of the *Arabidopsis thaliana* mutant line T1-25 and the genomic DNA of the wild-type *Arabidopsis thaliana* Col-0 only lies in that in a gene encoding protein AtDMP8, a base (T) deletion occurs in one chromosome at position 114 of SEQ ID No. 1, and a fragment CGT insertion occurs in the other chromosome at positions 114-115 of SEQ ID No. 1; and in a gene encoding protein AtDMP9, a fragment deletion occurs in one chromosome at positions 161-162 of SEQ ID No. 3, and a base (A) insertion occurs in the other chromosome at positions 160-161 of SEQ ID No. 3;

the difference between the genomic DNA of the *Arabidopsis thaliana* mutant line T1-28 and the genomic DNA of the wild-type *Arabidopsis thaliana* Col-0 only lies in that in a gene encoding protein AtDMP8, a fragment deletion occurs in one chromosome at positions 115-512 of SEQ ID No. 1, and a base (T) deletion occurs in the other chromosome at position 114 of SEQ ID No. 1, and in a gene encoding protein AtDMP9, and a base (A) insertion occurs in both chromosomes at positions 160-161 of SEQ ID No. 3;

the difference between the genomic DNA of the *Arabidopsis thaliana* mutant line T1-32 and the genomic DNA of the wild-type *Arabidopsis thaliana* Col-0 only lies in that in a gene encoding protein AtDMP8, a fragment deletion occurs in one chromosome at positions 115-511 of SEQ ID No. 1, and a base (T) insertion occurs in the other chromosome at positions 114-115 of SEQ ID No. 1, and in a gene encoding protein AtDMP9, and a base (C) deletion occurs in both chromosomes at position 161 of SEQ ID No. 3;

the difference of the genomic DNA of the *Arabidopsis thaliana* mutant line T2-33 and the wild-type *Arabidopsis thaliana* Col-0 only lies in that in a gene encoding protein AtDMP9, a base (T) insertion occurs in both chromosomes at positions 160-161 of SEQ ID No. 3, and a fragment insertion occurs in both chromosomes at positions 561-562 of SEQ ID No. 3, with the nucleotide sequence of the inserted fragment shown as SEQ ID No. 14;

the difference between the genomic DNA of the *Arabidopsis thaliana* mutant line T2-38 and the genomic DNA of the wild-type *Arabidopsis thaliana* Col-0 only lies in that in a gene encoding protein AtDMP8, a fragment deletion occurs in both chromosomes at positions 115-127 of SEQ ID No. 1, and in a gene encoding protein AtDMP9, a base (T) and a base (G) insertion occurs in both chromosomes at positions 160-161 of SEQ ID No. 3 and positions 562-563 of SEQ ID No. 3, respectively;

the difference between the genome DNA of the tomato mutant line sldmp-1 and the genome DNA of wild-type tomato AC only lies in that in a gene encoding SlDMP protein, and a base (C) insertion occurs in both chromosomes at positions 92-93 of SEQ ID No. 5;

the difference between the genome DNA of the tomato mutant line sldmp-2 and the genome DNA of wild-type tomato AC only lies in that in a gene encoding protein SlDMP, a fragment deletion occurs in both chromosomes at positions 93-249 of SEQ ID No. 5.

Another object of the present invention is to provide a method for preparing a plant haploid.

The preparation method of the plant haploid provided by the invention comprises the following steps: selfing the plant haploid inducer line or the offspring thereof prepared by the method or crossing the plant haploid inducer line or the offspring thereof with other plant materials as a male parent to obtain the selfed offspring or the cross-species offspring, namely the plant haploid; the plant is a dicotyledonous plant.

Furthermore, the preparation method of the plant haploid further comprises the following steps: performing fluorescent labeling identification and/or haploid traits identification and/or leaf ploidy identification and/or molecular marker identification on the selfed offspring or the cross-species offspring single plant, and selecting the offspring single plants identified as haploids by at least one method as plant haploids.

Furthermore, the fluorescent labeling identification method may be performed as follows: crossing the plant haploid inducer line carrying the fluorescent protein expression element as a male parent with a female parent to obtain a cross-species offspring, and judging whether the seed to be tested is a haploid or a diploid by detecting whether the seed of the cross-species offspring has a fluorescent signal; if the seed to be tested shows no fluorescence or weak fluorescence, the seed is a haploid or is a candidate; if the seed to be tested shows strong fluorescence, the seed is a diploid or a candidate. Furthermore, whether the seeds to be tested are fluorescent or not is detected by fluorescent light. Furthermore, the male parent carries a TagRFP fluorescent protein expression element driven by the promoter AtOLEO1, so that it can be judged whether it is a haploid or a diploid depending on whether the hybrid offspring seed has red fluorescence.

The haploid trait identification method can be performed as follows: if the plant to be tested has the traits of dwarf, narrow leaves growing upward, compact plant type, and male sterility, the plant is a haploid or a candidate; if the plant to be tested has the traits of high plant, broad and scattered leaves, and normal fertility, the plant is a diploid or a candidate.

The leaf ploidy identification method can be performed as follows: extracting cell nuclei of young leaves of a plant to be tested, and taking diploid plant leaves as a control; detecting the signal by a flow cytometry instrument, firstly detecting the diploid nuclear signal and setting the diploid nuclear signal peak at 50 (since the genetic materials in diploid cells are twice that in haploid cells, the haploid nuclear signal peak appears around 25). If the nuclear signal peak of the plant to be tested appears around 25, the plant is haploid or a candidate; and if the signal peak of the plant to be tested appears around 50, and the signal intensity enrichment position of the plant to be tested is the same as that of the diploid nucleus, the plant is diploid or a candidate.

The molecular marker identification may be performed as follows: carrying out PCR amplification by adopting a polymorphic primer between a male parent (a female parent haploid inducer line) and a female parent, and judging whether a plant to be tested is haploid or diploid according to a PCR amplification product; if the amplification product of the plant to be tested only has the banding pattern of the female parent without the banding pattern of the male parent, the plant is haploid or a candidate; if the amplification product of the plant to be tested has a heterozygous banding pattern of a male parent and a female parent, the plant is diploid or a candidate.

The plant haploid inducer line and the plant haploid prepared by the method also fall within the scope of the invention.

The plant haploid inducer line and the plant haploid include not only cells, tissues, and organs derived from the plant haploid inducer line and the plant haploid, such as seeds, leaves, fruits, stems, flowers, roots, but also propagation materials derived from the plant haploid inducer line and the plant haploid, such as a group consisting of pollen, ovaries, ovules, germs, endosperms, egg cells, cleavage, roots, root tips, hypocotyls, cotyledons, stems, leaves, flowers, anthers, seeds, meristematic cells, protoplasts, and tissue cultures.

Gene AtDMP8 in the *Arabidopsis thaliana* mutant line or gene AtDMP9 in the *Arabidopsis thaliana* mutant line or gene SlDMP in the tomato mutant line in the above method also falls within the scope of the present invention.

Any of the following uses D1) to D5) also falls within the scope of the present invention:

D1) application of the plant haploid inducer line prepared by the method in cultivating plant haploids;

D2) application of a substance for silencing or inhibiting the expression and/or activity of gene AtDMP8 and/or gene AtDMP9 in the plant genome or knocking out gene AtDMP8 and/or gene AtDMP9 or a substance for inhibiting the activity of protein AtDMP8 and/or protein AtDMP8 in cultivating plant haploid inducer lines or plant haploids;

D3) application of a substance for silencing or inhibiting the expression and/or activity of gene SlDMP in the plant genome or knocking out gene SlDMP or a substance for inhibiting the activity of protein SlDMP in cultivating plant haploid inducer lines or plant haploids;

D4) application of protein AtDMP8 or related biological material thereof and/or protein AtDMP9 or related biological material thereof in regulating induction rate of plant haploid inducer lines or improving induction rate of plant haploid inducer lines or cultivating plant haploid inducer lines or plant haploids;

D5) application of SlDMP protein or related biological materials thereof in regulating induction rate of plant haploid inducer lines or improving induction rate of plant haploid inducer lines or cultivating plant haploid inducer lines or plant haploids.

In any of above-mentioned uses or methods, protein AtDMP8 is a protein represented by a1) or a2) or a3) or a4):

a1) a protein with the amino acid sequence shown in SEQ ID No. 2;

a2) a fusion protein obtained by attaching a tag to the N-terminus and/or C-terminus of the protein shown in SEQ ID No. 2;

a3) a protein having the same function obtained by substituting and/or deleting and/or adding one or several amino acid residues to the amino acid sequence shown in SEQ ID No. 2;

a4) a protein having 75% or more homology with the amino acid sequence shown in SEQ ID No. 2 and having the same function; protein AtDMP9 is a protein represented by the following b 1) or b2) or b3) or b4):

b1) a protein with the amino acid sequence shown in SEQ ID No. 4;

b2) a fusion protein obtained by attaching a tag to the N-terminus and/or C-terminus of the protein shown in SEQ ID No. 4;

b3) a protein having the same function obtained by substituting and/or deleting and/or adding one or several amino acid residues to the amino acid sequence shown in SEQ ID No. 4;

b4) a protein having 75% or more homology with the amino acid sequence shown in SEQ ID No. 4 and having the same function.

The protein SlDMP is a protein represented by the following c1) or c2) or c3) or c4):

c1) a protein with the amino acid sequence shown in SEQ ID No. 6;

c2) a fusion protein obtained by attaching a tag to the N-terminus and/or C-terminus of the protein shown in SEQ ID No. 6;

c3) a protein having the same function obtained by substituting and/or deleting and/or adding one or several amino acid residues to the amino acid sequence shown in SEQ ID No. 6;

c4) a protein having 75% or more homology with the amino acid sequence shown in SEQ ID No. 6 and having the same function.

The protein AtDMP8 or AtDMP9 or SlDMP related biomaterial is any one of the following d1) to d12):

d1) a nucleic acid molecule encoding protein AtDMP8 or AtDMP9 or SlDMP;

d2) an expression cassette comprising the nucleic acid molecule of d1);

d3) a recombinant vector containing the nucleic acid molecule of d1);

d4) a recombinant vector containing the expression cassette of d2);

d5) a recombinant microorganism containing the nucleic acid molecule of d1);

d6) a recombinant microorganism containing the expression cassette of d2);

d7) a recombinant microorganism containing the recombinant vector of d3);

d8) a recombinant microorganism containing the recombinant vector of d4);

d9) a transgenic plant cell line comprising the nucleic acid molecule of d1);

d10) a transgenic plant cell line containing the expression cassette of d2);

d11) a transgenic plant cell line containing the recombinant vector of d3);

d12) a transgenic plant cell line comprising the recombinant vector of d4).

Furthermore, the nucleic acid molecule of d1) is a gene shown in the following 1) or 2) or 3) or 4):

1) a cDNA molecule or a genomic DNA molecule with the coding sequence shown in SEQ ID No. 1 or SEQ ID No. 3 or SEQ ID No. 5;

2) a cDNA molecule or a genomic DNA molecule having 75% or more identity with the nucleotide sequence defined in 1) and encoding protein AtDMP8 or AtDMP9 or SlDMP;

3) a cDNA molecule or a genomic DNA molecule derived from a dicotyledonous plant and having 75% or more identity with the nucleotide sequence defined in 1) and encoding protein AtDMP8 or AtDMP9 or SlDMP;

4) a cDNA molecule or a genomic DNA molecule hybridizing with the nucleotide sequence defined in 1) or 2) or 3) under stringent conditions and encoding protein AtDMP8 or AtDMP9 or SlDMP;

wherein SEQ ID No. 1 is a nucleic acid molecule encoding protein AtDMP8, SEQ ID No. 3 is a nucleic acid molecule encoding protein AtDMP9, and SEQ ID No. 5 is a nucleic acid molecule encoding protein SlDMP.

Furthermore, the substance knocking out gene AtDMP8 and/or gene AtDMP9 or the substance knocking out gene SlDMP is the CRISPR/Cas9 vector containing the target sequence as described above.

In any one of the above-mentioned uses or methods or plants, wherein the plants are dicotyledonous, specifically *Arabidopsis thaliana* or tomato; specifically, *Arabidopsis thaliana* may be wild-type *Arabidopsis thaliana* (Col-0) or ms1; specifically, the tomato may be wild-type tomato AC or Micro-Tom or $F_1$ generation material obtained by crossing tomato AC with Micro-Tom.

BRIEF DESCRIPTION OF THE DRAWINGS

FIGS. 6A-6D shows a graph comparing plants and fruits of wild-type tomato and sldmp mutants. Panels 6A and 6B show wild-type tomato and sldmp mutant plants, respectively, and panels 6C and 6D shows show wild-type tomato and sldmp mutant selfed fruits, respectively.

FIGS. 7A-7D shows a graph of fluorescence expression of tomato seeds. Panels 7A and 7B show the ungerminated and germinated performance of tomato seeds photographed under bright fields, and Panels 7C and 7D show the ungerminated and germinated performance of tomato seeds photographed under fluorescence.

FIG. 8 shows a graph comparing flow cytometry results for tomato haploids and diploids.

BEST MODE OF IMPLEMENTING THE INVENTION

Figure 1:
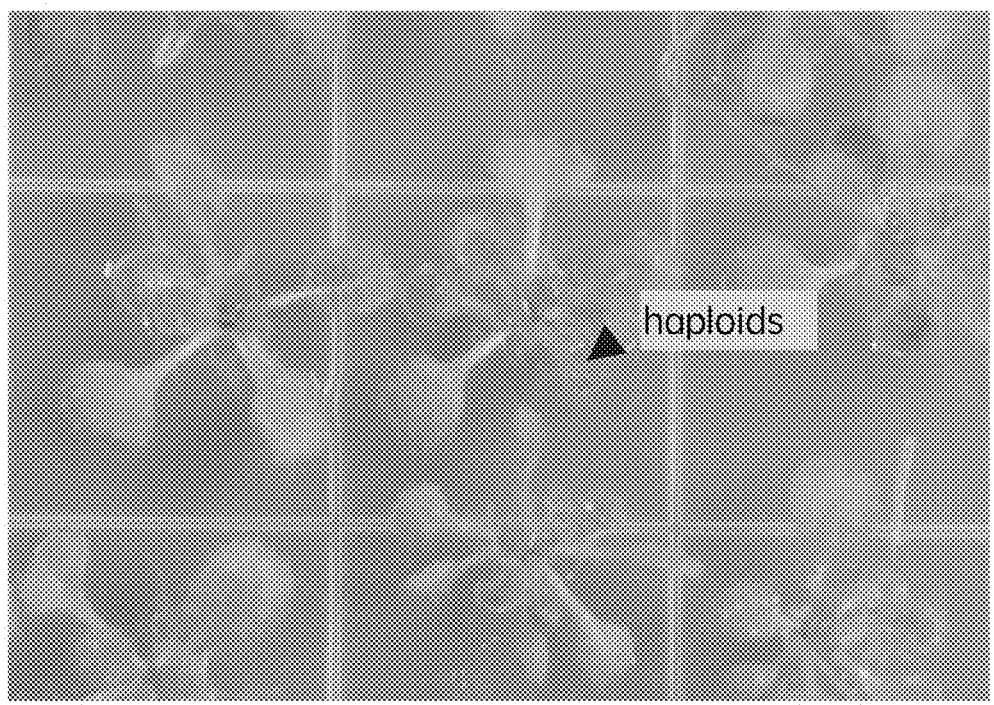
FIG. 1 shows a graph comparing *Arabidopsis thaliana* haploids and diploids. The plants indicated by the arrows are haploids.

The following examples facilitate a better understanding of the present invention but do not limit the present invention. The experimental methods in the following examples are conventional unless otherwise specified. The experimental materials used in the following examples were purchased from conventional biochemical reagent stores unless otherwise specified. In the quantitative experiments of the following examples, triplicate experiments are set up, and the results are averaged.

The pICSL4723 vector in the following examples is described in the document "Castel, B. and L. Tomlinson, et al. (2019). Optimization of T-DNA architecture for Cas9-mediated mutagenesis in *Arabidopsis thaliana*. PloS one, 14(1).", publicly available from the Chinese Agricultural University, the test material is used only for repeating the relevant experiments of the present invention and cannot be used for other purposes.

Wild-type *Arabidopsis thaliana* Col-0 and ms1 in the following examples are described in the literature "Rosso, M. G. and Y. Li, et al. (2003). An *Arabidopsis thaliana* T-DNA mutagenized population (GABI-Kat) for flanking sequence tag-based reverse genetics. Plant Mol Biol 53 (1-2): 247-59.", publicly available from China Agricultural University, the biological material is only used for repeating the relevant experiments of the present invention, and cannot be used for other purposes.

Wild-type tomato AC in the following examples is described in the literature " Yuan, G. and C. Jia, et al. (2010). Effect of brassinosteroids on drought resistance and abscisic acid concentration in tomato under water stress. Scientia Horticulturae 126 (2): 103-108.", publicly available from China Agricultural University, the biological material is only used for repeating the relevant experiments of the present invention, and cannot be used for other purposes.

The wild-type tomato Micro-Tom in the following examples is described in the literature "Sun, H. and S. Uchii, et al. (2006). A highly efficient transformation protocol for Micro-Tom, a model cultivar for tomato functional genomics. Plant and Cell Physiology 47 (3): 426-431.", publicly available from China Agricultural University, the biological material is only used for repeating the relevant experiments of the present invention, and cannot be used for other purposes.

The CDS sequence of gene AtDMP8 in the invention is shown in positions 95-826 of SEQ ID No. 1 in the sequence listing, and the amino acid sequence of the protein encoded by gene AtDMP8 is shown in SEQ ID No. 2.

The CDS sequence of gene AtDMP9 in the invention is shown in positions 141-875 of SEQ ID No. 3 in the sequence listing, and the amino acid sequence of the protein encoded by gene AtDMP9 is shown in SEQ ID No. 4.

The CDS sequence of gene SlDMP in the invention is shown in positions 1-678 of SEQ ID No. 5 in a sequence table, and the amino acid sequence of the protein encoded by gene SlDMP is shown in SEQ ID No. 6.

Example 1. Preparation of Gene AtDMP8 and/or Gene AtDMP9 Knockout *Arabidopsis thaliana* mutants and Uses Thereof I. Genes AtDMP8 and/or AtDMP9 were knocked out using a CRISPR/Cas9 system Genes AtDMP8 and/or AtDMP9 in *Arabidopsis thaliana* were knocked out by a CRISPR/Cas9 system to obtain gene AtDMP8 and/or gene AtDMP9 knockout *Arabidopsis thaliana* mutants. The specific steps were as follows:

1. Selection of sgRNA Sequences

Target site sequences were designed on gene AtDMP8 and/or gene AtDMP9, respectively, and were 20 bp in length.

The target site 1 was located at positions 98-117 of SEQ ID No. 1 and 144-163 of SEQ ID No. 3, and the sequence of sgRNA target site 1 was GAGAAAACAGAG-GAAAGCGT. (SEQ ID NO.15)

Target site 2 was located at positions 290-309 of SEQ ID No. 3, and the sequence of sgRNA target site 2 was AAGAGGTCGAAAACGTCGCA. (SEQ ID NO.16)

The target site 3 was located at 368-387 of SEQ ID No. 3, and the sequence of sgRNA target site 3 was TCAAGAGTGTTCCTGTCGGA. (SEQ ID NO.17)

The target site 4 was located at positions 509-528 of SEQ ID No. 1 and 558-577 of SEQ ID No. 3, and the sequence of sgRNA target site 4 was ATGACAACCGCGAGTC-CACG (SEQ ID NO.18).

2. Construction of CRISPR/Cas9 Vector

Figure 9A:
FIG. 9A and FIG. 9B shows a schematic diagram of the structure of the main elements in the recombinant vector. Panels 9A and 9B show a schematic diagram of the structure of *Arabidopsis thaliana* and tomato vector, respectively.
Figure 9B:
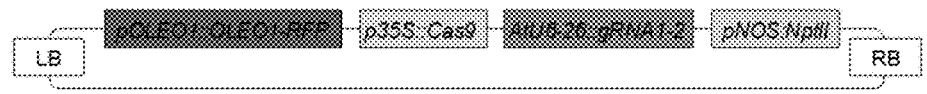

The CRISPR/Cas9 vector is a recombinant vector(vector structure diagram shown in FIG. 9A) obtained by connecting a DNA molecule shown in SEQ ID No. 7 (sgRNA expression element), a DNA molecule shown in SEQ ID No. 9 (Cas9 expression element), and a DNA molecule shown in SEQ ID No. 10 (fluorescent protein expression element) to a pICSL4723 vector through a golden gate method. The DNA molecule shown in SEQ ID No. 7 sequentially comprises a coding sequence of sgRNA targeted to the target site 1, a coding sequence of sgRNA targeted to the target site 2, a coding sequence of sgRNA targeted to the target site 2, and a coding sequence of sgRNA targeted to the target site 4, with an AtU6-26 promoter used for initiating the expression of the coding sequence of sgRNA found near the beginning of each sgRNA coding sequence.

3. Acquisition of Transgenic Plants

The CRISPR/Cas9 vector obtained in step 2 was transformed into *Agrobacterium* competent cells GV3101 through heat shock (*Agrobacterium* GV3101 competent cells were purchased from Beijing Aosen Dingxin Biotechnology Co., Ltd., and publicly available) to obtain a recombinant strain GV3101/CRISPR/Cas9.

Then the inflorescence of wild *Arabidopsis thaliana* Col-0 was infected with the recombinant strain GV3101/CRISPR/Cas9 by adopting a transformation method of infecting *Arabidopsis thaliana* inflorescences with *Agrobacterium* (i.e. the recombinant *Agrobacterium* was subjected to expanding propagation at 28° C., and *Arabidopsis thaliana* inflorescence was infected with the propagated *Agrobacterium* solution), and T1 generation transgenic *Arabidopsis thaliana* plant was obtained after red fluorescence screening.

4. Identification of Transgenic Plants with Mutation of Gene AtDMP8 and/or Gene AtDMP9

Leaves of the T1 generation transgenic *Arabidopsis thaliana* plant obtained in step 3 were collected, genomic DNA was extracted as a template, and PCR amplification was conducted by adopting the following two pairs of primers respectively, to obtain PCR amplification products of different lines.

The sequences of the primers for detecting gene AtDMP8 mutant sequence were as follows:

```
DMP8F1:
                                    (SEQ ID NO. 19)
TGCGAAATGAGATTGGTTTTGGG;

DMP8R1:
                                    (SEQ ID NO. 20)
AAACACCCTGTGACTCTCCG.
```

The sequences of the primers for detecting gene AtDMP9 mutant sequence were as follows:

```
DMP9F1:
                                    (SEQ ID NO. 21)
ATAACCGTCAATAACCGCCG;

DMP9R2:
                                    (SEQ ID NO. 22)
CCAGTCATGCAACCAACACC.
```

The PCR amplification products of different lines were subjected to Sanger sequencing, and the sequencing results were compared with AtDMP8 and AtDMP9 of wild-type *Arabidopsis thaliana* Col-0, respectively. The genotypes of AtDMP8 and AtDMP9 were identified according to the following principles, respectively.

If the sequence had a doublet characteristic from the target site sequence, the genotype of the line was heterozygous (i.e. gene AtDMP8 and/or gene AtDMP9 mutated on one of the two homologous chromosomes, and unmutated on the other chromosome), and the line was a T1 generation transgenic *Arabidopsis thaliana* heterozygous mutant line;

For a sequence with specific singlet characteristics from the target site sequence, if it was the same as the gene sequence of AtDMP8 and AtDMP9 of wild-type *Arabidopsis thaliana* Col-0, the genotype of the line was wild-type, that is there was no mutation on the gene sequence of AtDMP8 and AtDMP9; if it was different from the gene sequence of AtDMP8 and/or AtDMP9 of the wild-type *Arabidopsis thaliana* Col-0, the genotype of the line was homozygous (the gene AtDMP8 and/or gene AtDMP9 mutated on both homologous chromosomes), the line was a T1 generation transgenic *Arabidopsis thaliana* homozygous mutant line.

The identification results were shown in Tables 1 and 2 (Tables 1 and 2 were mutations genes AtDMP8 and AtDMP9 of T1 generation transgenic *Arabidopsis thaliana*, respectively): among 41 T1 generation transgenic *Arabidopsis thaliana* plants, there was 33 T1 generation transgenic plants with mutation of gene AtDMP8, of which 2 plants have a homozygous mutation in gene AtDMP8 and 17 plants had a biallelic mutation in gene AtDMP8. There were 28 T1 generation transgenic plants with mutation of gene AtDMP9, of which 5 plants had a homozygous mutation in gene AtDMP9 and 7 plants had a biallelic mutation in gene AtDMP9. There were 12 plants with homozygous/biallelic mutations in AtDMP8 and AtDMP9. Individuals that resulted in a frameshift mutation (deletion not a multiple of 3) among homozygous/biallelic mutant individuals were further selected for phenotypic identification. There were three types of AtDMP8 homozygous mutation/biallelic mutation, AtDMP9 homozygous mutation/biallelic mutation, and AtDMP8 and AtDMP9 homozygous mutation/biallelic mutation.

TABLE 1

Gene AtDMP8 mutation types in T1 generation transgenic *Arabidopsis thaliana*

| Serial Number | AtDMP8 | allele 1 | allele2 |
|---|---|---|---|
| T1-1 | Biallelic mutation | GAAAG------------------ | GGGGCGTCGGAATCA (SEQ ID NO. 23)..GACTCCACGT (SEQ ID NO. 24) |
| T1-2 | Heterozygous mutation | ------------------CTCGC | WT |
| T1-3 | Biallelic mutation | GAAAGACGTCGGAATCA (SEQ ID NO. 25)..GACTCCACGT (SEQ ID NO. 26) | GGGTCGTCGGAATCA (SEQ ID NO. 27)..GACTCCACGT (SEQ ID NO. 28) |
| T1-4 | Wild-type | WT | WT |
| T1-5 | Wild-type | WT | WT |
| T1-6 | Biallelic mutation | GAAAG------------------ | GGAA--CGTCGGAATCA (SEQ ID NO. 29)..GACTCCACGT (SEQ ID NO. 30) |
| T1-7 | Heterozygous mutation | GAAAGACGTCGGAATCA (SEQ ID NO. 31)..GACTCCACGT (SEQ ID NO. 32) | WT |
| T1-8 | Heterozygous mutation | GAAAGGCGTCGGAATCA (SEQ ID NO. 33)..GACTCCACGT (SEQ ID NO. 34) | WT |
| T1-9 | Biallelic mutation | GAAAGTCGTCGGAATCA (SEQ ID NO. 35)..GACTCCACGT (SEQ ID NO. 36) | GGGTCG--GGAATCA..GACTCCACGT (SEQ ID NO. 37) |
| T1-10 | Biallelic mutation | GAAAG------------------------ | GGGGCGTCGGAATCA (SEQ ID NO. 38)..GACTCCACGT (SEQ ID NO. 39) |
| T1-11 | Homozygous mutation | GAAAGGCGTCGGAATCA (SEQ ID NO. 40)..GACTCCACGT (SEQ ID NO. 41) | GGGGCGTCGGAATCA (SEQ ID NO. 42)..GACTCCACGT (SEQ ID NO. 43) |
| T1-12 | Biallelic mutation | GAAAGGCGTCGGAATCA (SEQ ID NO. 44)..GACTCCACGT (SEQ ID NO. 45) | GGG-GTCGGAATCA (SEQ ID NO. 46)..GACTCCACGT (SEQ ID NO. 47) |
| T1-13 | Wild-type | WT | WT |
| T1-14 | Heterozygous mutation | GAAAGGCGTCGGAATCA (SEQ ID NO. 8)..GACTCCACGT (SEQ ID NO. 49) | WT |
| T1-15 | Biallelic mutation | GAAAG------------ | GGGGCGTCGGAATCA (SEQ ID NO. 50)..GACTCCACGT (SEQ ID NO. 51) |
| T1-16 | Heterozygous mutation | GAA-------(+49 bp)---TTCATGAA | WT |
| T1-17 | Wild-type | WT | WT |
| T1-18 | Heterozygous mutation | GAAA-CGTCGGAATCA (SEQ ID NO. 52)..GACTCCACGT (SEQ ID NO. 53) | WT |
| T1-19 | Biallelic mutation | GAAA-CGTCGGAATCA (SEQ ID NO. 54)..CTCCACGTG-ACTC | GGG------------------------ |
| T1-20 | Heterozygous mutation | GAAAG--TCGGAATCA..GACTCCACGT (SEQ ID NO. 55) | WT |
| T1-21 | Heterozygous mutation | GAAAG----------------GACTCGC | WT |

TABLE 1-continued

Gene AtDMP8 mutation types in T1 generation transgenic *Arabidopsis thaliana*

| Serial Number | AtDMP8 | allele 1 | allele2 |
|---|---|---|---|
| T1-22 | Wild-type | WT | WT |
| T1-23 | Biallelic mutation | GAAAG------------ | GGGTCGTCGGAATCA (SEQ ID NO. 56) |
| T1-24 | Biallelic mutation | GAAAG----------------GACTCGC | GGGTCGTCGGAATCA (SEQ ID NO. 57) |
| T1-25 | Biallelic mutation | GAAA-CGTCGGAATCA (SEQ ID NO. 58)..GACTCCACGT (SEQ ID NO. 59) | GGG(+3 bp)CGTCGGAATCA (SEQ ID NO. 60) |
| T1-26 | Wild-type | WT | WT |
| T1-27 | Biallelic mutation | GAAAG------------ | GG-CGTCGGAATCA (SEQ ID NO. 61) |
| T1-28 | Biallelic mutation | GAAAG----------------GACTCGC | GG-CGTCGGAATCA (SEQ ID NO. 62) |
| T1-29 | Wild-type | WT | WT |
| T1-30 | Biallelic mutation | GAAAGGCGTCGGAATCA (SEQ ID NO. 63)..GACTCCACGT (SEQ ID NO. 64) | GGG---------------ACTCGC |
| T1-31 | Heterozygous mutation | GAAAGACGTCGGAATCA (SEQ ID NO. 65)..GACTCCACGT (SEQ ID NO.66) | WT |
| T1-32 | Biallelic mutation | GAAAG---------------- | GGGTCGTCGGAATCA (SEQ ID NO. 67) |
| T1-33 | Heterozygous mutation | GAAAG------------(+202 bp)---- | WT |
| T1-34 | Biallelic mutation | GAAAG-----------------GACTCGC | GGGTCGTCGGAATCA (SEQ ID NO. 68) |
| T1-35 | Biallelic mutation | GAAAGACGTCGGAATCA (SEQ ID NO. 69)..GACTCCACGT (SEQ ID NO. 70) | GGGGCGTCGGAATCA (SEQ ID NO. 71)..GACTCCACGT (SEQ ID NO. 72) |
| T1-36 | Heterozygous mutation | GAAAG-----------------GACTCGC | WT |
| T1-37 | Heterozygous mutation | GAAAGTCGTCGGAATCA (SEQ ID NO. 73)--GACTCCACGT (SEQ ID NO. 74) | WT |
| T1-38 | Homozygous mutation | GAAAG--------GTTTACA--CCAC GTGGACT (SEQ ID NO. 75) | GGG--------GTTTACA..CCACGT GG |
| T1-39 | Wild-ptye | WT | WT |
| T1-40 | Heterozygous mutation | GAAAG-------------------- | WT |
| T1-41 | Heterozygous mutation | GAAAGGCGTCGGAATCA (SEQ ID NO. 76)..GACTCCACGT (SEQ ID NO. 77) | WT |

Note:
"-" stands for the presence of base deletions, "." stands for omitted bases.

TABLE 2

Gene AtDMP9 mutation types in T1 generation transgenic *Arabidopsis thaliana*

| Serial Number | AtDMP9 | allele1 | allele2 |
|---|---|---|---|
| T1-1 | Biallelic mutation | GGAAAGACGTCGG (SEQ ID NO. 78)..GACGCCA | GGAAAG-GTCGG..GACGCCA |
| T1-2 | Wild-type | WT | WT |
| T1-3 | Homozygous mutation | GGAAA-CGTCGG..GACGCCA | GGAAA-CGTCGG..GACGCCA |
| T1-4 | Heterozygous mutation | GGAA-GCGTCGG..GACGCCA | WT |
| T1-5 | Wild-type | WT | WT |
| T1-6 | Homozygous mutation | GGAAAG(+16 bp)CGTCGGA..GACGCCA | GGAAAG(+16 bp)CGTCGG..GACGCCA |
| T1-7 | Heterozygous mutation | GGAAAGACGTCGG (SEQ ID NO. 79)..GACGCCA | WT |
| T1-8 | Wild-type | WT | WT |
| T1-9 | Wild-type | WT | WT |
| T1-10 | Biallelic mutation | GGAAAGCG------CAATGTC..GCCA | GGAAAGACGTCGG (SEQ ID NO. 80)..GACGCCA |
| T1-11 | Biallelic mutation | GGAAAGGCGTCGG (SEQ ID NO. 81).GACGCCA | GGAAAG(+16 bp)CGTCGG..GACGCCA |
| T1-12 | Heterozygous mutation | GGAAAGGCGTCGG (SEQ ID NO. 82)..GACGCCA | WT |
| T1-13 | Wild-type | WT | WT |
| T1-14 | Heterozygous mutation | GGAAAGACGTCGG (SEQ ID NO. 83)..GACGCCA | WT |
| T1-15 | Heterozygous mutation | GGAAAGGCGTCGG (SEQ ID NO. 84)..GACGCCA | WT |
| T1-16 | Heterozygous mutation | GGAAAG-GTCGG..GACGCCA | WT |
| T1-17 | Wild-type | WT | WT |
| T1-18 | Wild-type | WT | WT |
| T1-19 | Biallelic mutation | GGAAAG----------GGA | GGAAAG----------TCGCGGTGTTC (SEQ ID NO. 85) |
| T1-20 | Heterozygous mutation | GGA---CGTCGG..GACGCCA | WT |
| T1-21 | Heterozygous mutation | GGAAAGACGTCGG (SEQ ID NO. 86)..GACGCCA | WT |
| T1-22 | Heterozygous mutation | GGAAAG--------GGA | WT |
| T1-23 | Heterozygous mutation | GGAAAGACGTCGG (SEQ ID NO. 87)..GACGCCA | WT |
| T1-24 | Biallelic mutation | GGAAAG--------GGA | GGAA--CGTCGG..GACGCCA |
| T1-25 | Biallelic mutation | GGAAAG--TCGG.GACGCCA | GGAAAGACGTCGG (SEQ ID NO. 88)..GACGCCA |

TABLE 2-continued

Gene AtDMP9 mutation types in T1 generation transgenic *Arabidopsis thaliana*

| Serial Number | AtDMP9 | allele1 | allele2 |
|---|---|---|---|
| T1-26 | Heterozygous mutation | GGAAAG-GTCGG..GACGCCA | WT |
| T1-27 | Heterozygous mutation | GG----CGTCGG..GACGCCA | WT |
| T1-28 | Homozygous mutation | GGAAAGACGTCGG (SEQ ID NO. 89)..GACGCCA | GGAAAGACGTCGG (SEQ ID NO. 90).GACGCCA |
| T1-29 | Wild-type | WT | WT |
| T1-30 | Biallelic mutation | GGAAAG--------GGA | GGAAA-CGTCGG...GACGCCA |
| T1-31 | Heterozygous mutation | GGAAA-CGTCGG..GACGCCA | WT |
| T1-32 | Homozygous mutation | GGAAAG-GTCGG..GACGCCA | GGAAAG-GTCGG..GACGCCA |
| T1-33 | Heterozygous mutation | GGAAAGACG..CCACGTG(+401 bp)GA | WT |
| T1-34 | Wild-type | WT | WT |
| T1-35 | Heterozygous mutation | GGAA--CGTCGG..GACGCCA | WT |
| T1-36 | Heterozygous mutation | GGAAAGCGTCGG (SEQ ID NO. 91)...GACGCCAA | WT |
| T1-37 | Wild-type | WT | WT |
| T1-38 | Homozygous mutation | GGAAAGTCGTCGG (SEQ ID NO. 92)...GACGCCACGTGGGA (SEQ ID NO. 93) | GGAAAGTCGTCGG (SEQ ID NO. 94)...GACGCCACGTGGGA (SEQ ID NO. 95) |
| T1-39 | Wild-type | WT | WT |
| T1-40 | Wild-type | WT | WT |
| T1-41 | Wild-type | WT | WT |

Note:
"-" stands for the presence of base deletions, "." stands for omitted bases.

The obtained T1 generation transgenic *Arabidopsis thaliana* gene AtDMP8 mutant lines comprised T1-34, and the specific mutations were as follows:

Sequencing identification showed that: the difference between the genomic DNA of T1 generation transgenic *Arabidopsis thaliana* gene AtDMP8 mutant lines T1-34 and the genomic DNA of the wild-type *Arabidopsis thaliana* Col-0 only lies in that in a gene encoding protein AtDMP8, a fragment deletion occurred in one chromosome at positions 115-512 of SEQ ID No. 1, and a base (T) insertion occurred in the other chromosome at positions 114-115 of SEQ ID No. 1.

The obtained T1 generation transgenic *Arabidopsis thaliana* genes AtDMP8 and AtDMP9 double mutant lines comprised T1-6, T1-11, T1-19, T1-24, T1-25, T1-28, and T1-32, and the specific mutations were as follows:

Sequencing identification showed that: the difference between the genomic DNA of T1 generation transgenic *Arabidopsis thaliana* genes AtDMP8 and AtDMP9 double mutant lines T1-6 and the genomic DNA of the wild-type *Arabidopsis thaliana* Col-0 only lies in that in a gene encoding protein AtDMP8, a fragment deletion occurred in one chromosome at positions 115-512 of SEQ ID No. 1, and a fragment deletion occurred in the other chromosome at positions 113-114 of SEQ ID No. 1, and in a gene encoding protein AtDMP9, a fragment insertion occurred at positions 160-161 of SEQ ID No. 3, with the nucleotide sequence of the inserted fragment shown as GTTTACACGGCGACTC (SEQ ID No. 13).

Sequencing identification showed that: the difference between the genomic DNA of T1 generation transgenic *Arabidopsis thaliana* genes AtDMP8 and AtDMP9 double mutant lines T1-11 and the genomic DNA of the wild-type *Arabidopsis thaliana* Col-0 only lies in that in a gene encoding protein AtDMP8, a base (T) insertion occurred at positions 114-115 of SEQ ID No. 1, and in a gene encoding protein AtDMP9, a base (T) insertion occurred in one chromosome at positions 160-161 of SEQ ID No. 3, and a fragment insertion occurred in the other chromosome at positions 160-161 of SEQ ID No. 3, with the nucleotide sequence of the inserted fragment shown as GTTTA-CACGGCGACTC (SEQ ID No. 13).

Sequencing identification showed that: the difference between the genomic DNA of T1 generation transgenic *Arabidopsis thaliana* genes AtDMP8 and AtDMP9 double mutant lines T1-19 and the genomic DNA of the wild-type *Arabidopsis thaliana* Col-0 only lies in that in a gene encoding protein AtDMP8, a base (T) deletion occurred in one chromosome at position 114 of SEQ ID No. 1, and a fragment deletion occurred in the other chromosome at positions 115-511 of SEQ ID No. 1; and in a gene encoding protein AtDMP9, a fragment deletion occurred in one chromosome at positions 161-560 of SEQ ID No. 3, and a fragment deletion occurred in the other chromosome at positions 161-564 of SEQ ID No. 3.

Sequencing identification showed that: the difference between the genomic DNA of T1 generation transgenic *Arabidopsis thaliana* genes AtDMP8 and AtDMP9 double mutant lines T1-24 and the genomic DNA of the wild-type *Arabidopsis thaliana* Col-0 only lies in that in a gene encoding protein AtDMP8, a fragment deletion occurred in one chromosome at positions 115-512 of SEQ ID No. 1, and a base (T) insertion occurred in the other chromosome at positions 114-115 of SEQ ID No. 1; and in a gene encoding protein AtDMP9, a fragment deletion occurred in one chromosome at positions 161-560 of SEQ ID No. 3, and a fragment deletion occurred in the other chromosome at positions 159-160 of SEQ ID No. 3.

Sequencing identification showed that: the difference between the genomic DNA of T1 generation transgenic *Arabidopsis thaliana* genes AtDMP8 and AtDMP9 double mutant lines T1-25 and the genomic DNA of the wild-type *Arabidopsis thaliana* Col-0 only lies in that in a gene encoding protein AtDMP8, a base (T) deletion occurred in one chromosome at position 114 of SEQ ID No. 1, and a fragment CGT insertion occurred in the other chromosome at positions 114-115 of SEQ ID No. 1; and in a gene encoding protein AtDMP9, a fragment deletion occurred in one chromosome at positions 161-162 of SEQ ID No. 3, and a base (A) insertion occurred in the other chromosome at positions 160-161 of SEQ ID No. 3.

Sequencing identification showed that: the difference between the genomic DNA of T1 generation transgenic *Arabidopsis thaliana* genes AtDMP8 and AtDMP9 double mutant lines T1-28 and the genomic DNA of the wild-type *Arabidopsis thaliana* Col-0 only lies in that in a gene encoding protein AtDMP8, a fragment deletion occurred in one chromosome at positions 115-512 of SEQ ID No. 1, and a base (T) deletion occurred in the other chromosome at position 114 of SEQ ID No. 1; and in a gene encoding protein AtDMP9, a base (A) insertion occurred at positions 160-161 of SEQ ID No. 3.

Sequencing identification showed that: the difference between the genomic DNA of T1 generation transgenic *Arabidopsis thaliana* genes AtDMP8 and AtDMP9 double mutant lines T1-32 and the genomic DNA of the wild-type *Arabidopsis thaliana* Col-0 only lies in that in a gene encoding protein AtDMP8, a fragment deletion occurred in one chromosome at positions 115-511 of SEQ ID No. 1, and a base (T) insertion occurred in the other chromosome at positions 114-115 of SEQ ID No. 1, and in a gene encoding protein AtDMP9, a base (C) deletion occurred at position 161 of SEQ ID No. 3;

5. Identification of T2 Generation Transgenic *Arabidopsis thaliana* Genotyping

T1 generation transgenic *Arabidopsis thaliana* gene AtDMP8 and/or gene AtDMP9 mutant lines T1-19, T1-33, and T1-38 obtained in step 4 were selfed, seeds were sowed after harvesting to obtain T2 generation transgenic *Arabidopsis thaliana*. The specific method for identifying the genotypes of genes AtDMP8 and AtDMP9 of T2 generation transgenic *Arabidopsis thaliana* was as follows: with the genomic DNA of T2 transgenic *Arabidopsis thaliana* as a template, the genotypes of genes AtDMP8 and AtDMP9 in T2 transgenic *Arabidopsis thaliana* were identified by using mutant sequence detection primers of AtDMP8 (DMP8F1 and DMP8R1) and AtDMP9 (DMP9F1 and DMP9R2) according to the method in step 4, respectively.

The obtained T2 generation transgenic *Arabidopsis thaliana* gene AtDMP8 mutant homozygous lines comprised T2-33-1, T2-33-2, and T2-33-3 which have the same mutation sequences, and the specific mutations were as follows:

Sequencing identification showed that: the difference between the genomic DNA of T2 generation transgenic *Arabidopsis thaliana* gene AtDMP8 homozygosis mutant lines T2-33-1, T2-33-2, and T2-33-3 and the genomic DNA of the wild-type *Arabidopsis thaliana* Col-0 only lies in that in the gene encoding protein AtDMP8, a fragment at positions 115-511 of SEQ ID No. 1 was substituted with a fragment of size 202 bp. The nucleotide sequence of the fragment with the size of 202 bp was specifically as follows:

(SEQ ID NO. 96)
GAAATTGACGAGCATTGATGTCTTCGAAACCGTTTTTTGAACTCCTTTC

GCCACCATGCGACGTTTTCTACCTTTTCCTCCTCCCGCGGCGGCTCCTG

CCGGAAGCATAGGCAGTGAAGAGAGAGGGACAGGTTTGGGCGACCGAGA

CGATGTTGGTGACGGATTTTGCGTCGTTGTCGTCGTGTAAACTCTGATT

CCGACG.

The obtained T2 generation transgenic *Arabidopsis thaliana* gene AtDMP9 homozygous lines comprised T2-33-4, T2-33-5, and T2-33-6 which have the same mutation sequences, and the specific mutations were as follows:

Sequencing identification showed that: the difference between the genomic DNA of T2 generation transgenic *Arabidopsis thaliana* gene AtDMP9 homozygosis mutant lines T2-33-1, T2-33-2, and T2-33-3 and the genomic DNA of the wild-type *Arabidopsis thaliana* Col-0 only lies in that in the gene encoding protein AtDMP9, a base (T) insertion occurred at positions 160-161 of SEQ ID No. 3, and a fragment insertion occurred at positions 561-562 of SEQ ID NO 3, with the nucleotide sequence shown as:

(SEQ ID NO 14)
CGTCGGAATCAGAGTTTACACGGCGACTCCGCCGCAAAAACCATCACCA

TCACCACCTTCTCGTTCACCAAAACCCGTCTTAATCTCTTCATTGCCTT

CCCTCCCGTCAGGAGCCGCCGCTGGAGGAGGAAGAGGTCGAAAACGTCG

CATGGTGGCGCAAGGAGTTCAAAAAACGGTTTCGAAGACATCAATGCTC

GTCAACTTCCTTCCGACAGGAACACTCTTGATGTTCGAAATGGTTCTTC

-continued
```
CATCAATATACCGTGACGGAGACTGTAACGGAATCAACACACTCATGAT

TCATCTCCTCTTGCTTCTTTGCGCAATGTCTTGTTTCTTCTTCCATTTT

ACCGACAGTTTCAAAGCATCCGATGGGAAGATCTACTACGGTTTCGTGA

CGCCACGTG.
```

The obtained T2 generation transgenic *Arabidopsis thaliana* genes AtDMP8 and AtDMP9 homozygous mutant lines comprised T2-19, T2-38-1, and T2-38-2, with the mutation types of each line as follows:

Sequencing identification showed that: the difference between the genomic DNA of T2 generation transgenic *Arabidopsis thaliana* genes AtDMP8 and AtDMP9 homozygosis mutant lines T2-19 and the genomic DNA of the wild-type *Arabidopsis thaliana* Col-0 only lies in that in a gene encoding protein AtDMP8, a fragment deletion occurred at positions 115-511 of SEQ ID No. 1, and in a gene encoding protein AtDMP9, a fragment deletion occurred at positions 161-564 of SEQ ID No. 3.

Sequencing identification showed that: the difference between the genomic DNA of T2 generation transgenic *Arabidopsis thaliana* genes AtDMP8 and AtDMP9 homozygosis mutant lines T2-38-1 and T2-38-2 and the genomic DNA of the wild-type *Arabidopsis thaliana* Col-0 only lies in that in a gene encoding protein AtDMP8, a fragment deletion occurred at position 115-127 of SEQ ID No. 1, and in a gene encoding protein AtDMP9, a fragment insertion occurred at positions 160-161 of SEQ ID No. 3 and positions 562-563 of SEQ ID No. 3.

The above T1 and T2 generation transgenic *Arabidopsis thaliana* mutant lines were selected for the following haploid induction capacity analysis experiments.

II. Application of Gene AtDMP8 and/or Gene AtDMP9 Knockout *Arabidopsis thaliana* Mutant in Inducing the Haploid Generation (A) Identification of Haploid Selfing Induction Ability of AtDMP8 and AtDMP9 Knockout *Arabidopsis thaliana* Mutants Three types of mutants obtained from genes AtDMP8 and AtDMP9 were respectively selfed to obtain selfed offspring, and haploid identification was carried out on the selfed offspring by the following method (since wild *Arabidopsis thaliana* Col was a homozygous selfed line, the mutant selfed offspring obtained by knocking out genes AtDMP8 and AtDMP9 on this background cannot identify haploids through molecular markers):

1. Identification of Plant Phenotype

Figure 2:
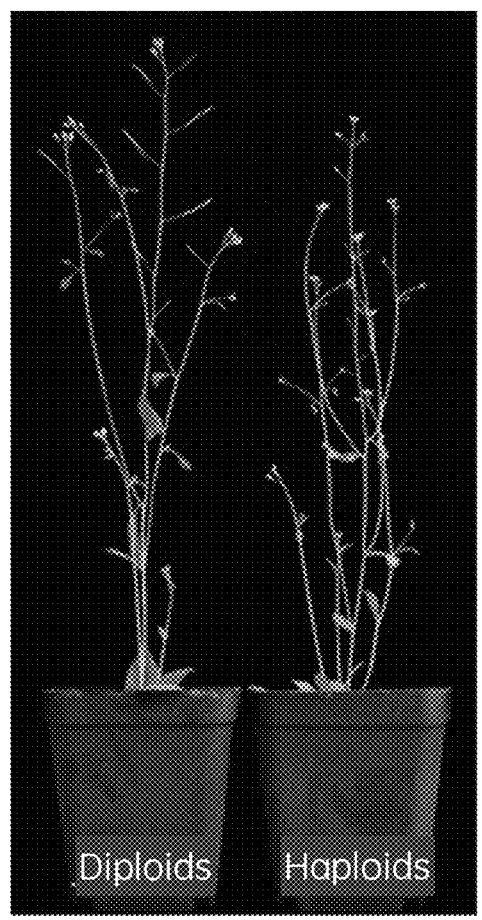
FIG. 2 shows a graph comparing *Arabidopsis thaliana* haploids and diploids after bolting

After the selfed seeds were planted, the phenotypes of a single plant were observed, with haploidy showed dwarf, narrow leaves growing upward, compact plant type, and male sterility, while diploid showed high plant, broad and scattered leaves, and normal fertility (FIG. 1, FIG. 2).

2. Leaf Identification by Flow Cytometry

Figure 3:
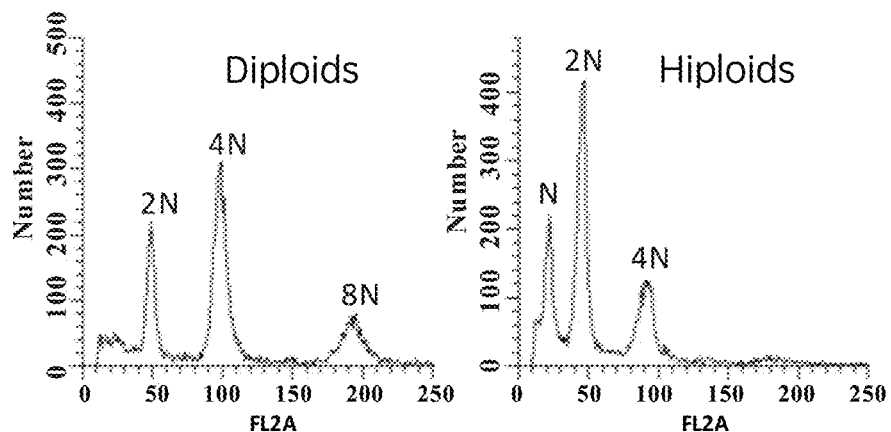
FIG. 3 shows a graph comparing flow cytometry results for *Arabidopsis thaliana* haploids and diploids.

Flow cytometry was conducted on the plant with the haploid character obtained in step 1, wherein the specific method was as follows: cell nuclei of young leaves of a plant to be tested was extracted, and diploid *Arabidopsis thaliana* leaves were used as a control; the signal was then detected by a flow cytometry instrument, the diploid nuclear signal was firstly detected, and the diploid nuclear signal peak position was set at 50 (since the genetic materials in diploid cells were twice that in haploid cells, the haploid nuclear signal peak position appeared around 25). And if the nuclear signal peak position of the plant to be tested appears around 25, the plant to be tested is considered to be a haploid plant. If the signal peak of the plant to be tested appears around 50, it was considered that the signal intensity enrichment position of the plant to be tested is the same as that of the diploid nucleus, and the plant to be tested was diploid (FIG. 3).

The identification results were counted and the induction rate was calculated according to the following formula: induction rate (%)=(number of haploid plants/total number of plants)×100. As can be seen, after simultaneous mutation of the genes AtDMP8 and AtDMP9, haploids can be obtained in selfed offspring.

TABLE 3

Haploid induction rate statistics in selfed offspring of dmp mutants

| Genotype | Plant number | Total plant number | Number of haploids | Haploid induction rate (%) |
|---|---|---|---|---|
| WT | Col-0 | 523 | 0 | 0 |
| dmp8 | T2-33-1 | 270 | 0 | 0 |
| dmp9 | T2-33-4 | 183 | 0 | 0 |
| dmp8dmp9 | T2-38-1 | 165 | 6 | 3.64 |

A. Identification of Hybridization Induction Ability of AtDMP8 and AtDMP9 Knockout *Arabidopsis thaliana* Mutants The three types of mutants obtained from genes AtDMP8 and AtDMP9 were crossed with *Arabidopsis thaliana* ms1 materials to obtain cross-species offspring, and the haploids in the cross-species offspring were identified by the following methods:

1. Fluorescent Labeling Identification

Figures 4A, 4B:
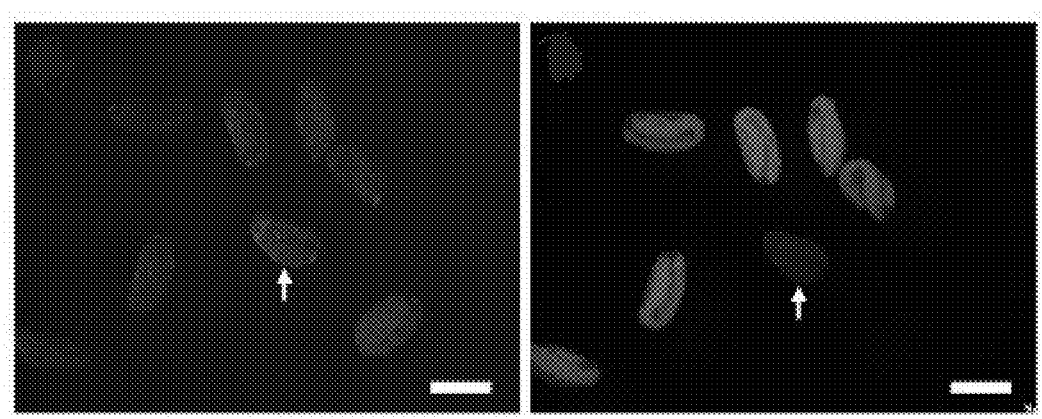
FIG. 4A and FIG. 4B shows a graph of fluorescence identification of *Arabidopsis thaliana* haploids. Panel 4A shows the phenotype of *Arabidopsis thaliana* seeds under white light, Panel 4B shows the phenotype of *Arabidopsis thaliana* seeds under fluorescence, and the seeds indicated by the arrows are haploids.

The CRISPR/Cas9 vector carried the expression element of TagRFP (Entacmaea quadricolor) driven by the promoter AtOLEO1. Since the promoter AtOLEO1 was specifically expressed in mature seed embryos, the fluorescent signal of TagRFP may be observed by fluorescent light. Therefore, the mutant carrying the expression element as a male parent was hybridized with other non-fluorescent female parent materials to obtain seeds, wherein embryos of diploid seeds showed strong red fluorescence due to having the genome of the male parent, while embryos of haploid seeds showed no fluorescence or weak fluorescence due to being derived from the female parent (FIGS. 4A-4B).

2. Molecular Marker Identification

The seeds with no fluorescence and weak fluorescence identified in step 1 were further planted, the genomic DNA was extracted, and PCR amplification was conducted adopting AtDMP8 and AtDMP9 knockout *Arabidopsis thaliana* mutant polymorphic primer 092B02-F(092B02-F: CAGCTGAGATGAACGAGTTGTCTT) (SEQ ID NO.97), 092B02-R (092B02-R: TCTTTTGAGTCACTCCGTATGTCC) (SEQ ID NO.98), and LB-o8474 (LB-o8474: ATAATAACGCTGCGGACATCTACATTTT) (SEQ ID NO.99), and the amplified product was subjected to agarose banding pattern detection if the size of the amplified product of the individual plant to be tested was 500 bp, showing 1 band, it was considered the individual plant band to be the *Arabidopsis thaliana* ms1 banding pattern without banding pattern of the male parent material, the individual plant was female parent haploid. If the size of the amplification products of the individual plant to be tested was 500 bp and 1094 bp, showing 2 bands, the individual plant band was considered to be a heterozygous banding pattern of *Arabidopsis thaliana* ms1 and a transgenic

Figure 5:
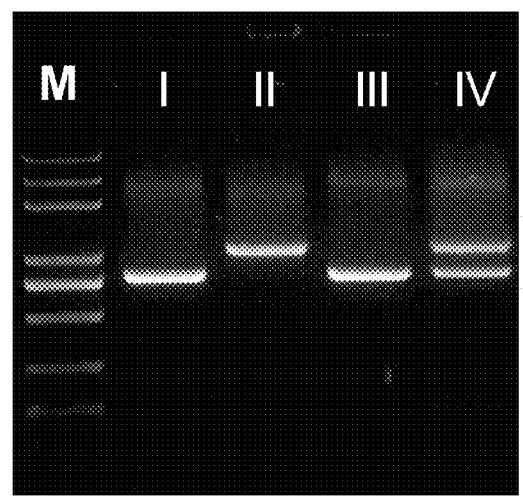
FIG. 5 shows a gel image of molecular marker verification of *Arabidopsis thaliana* haploids and diploids. M is a 2K molecular marker, I is a female parent material banding pattern, II is a male parent material banding pattern, III is a haploid banding pattern, and IV is a diploid banding pattern.

*Arabidopsis thaliana* mutant line, the individual plant was an offspring of a normal hybrid and was diploid (FIG. 5).

3. Identification of Mature Plants Phenotype

The phenotypes of the plants identified in steps 1 and 2 were further observed, with haploidy showed dwarf, narrow leaves growing upward, compact plant type, and male sterility, while diploid showed high plant, broad, and scattered leaves, and normal fertility.

4. Leaf Identification by Flow Cytometry

Flow cytometry was conducted on the plant with the haploid character obtained in step 3, wherein the specific method was as follows: cell nuclei of young leaves of a plant to be tested was extracted, and diploid *Arabidopsis thaliana* leaves were used as a control; the signal was then detected by a flow cytometry instrument, the diploid nuclear signal was firstly detected, and the diploid nuclear signal peak position was set at 50 (since the genetic materials in diploid cells were twice that in haploid cells, the haploid nuclear signal peak position appeared around 25). And if the nuclear signal peak position of the plant to be tested appears around 25, the plant to be tested is considered to be a haploid plant. If the signal peak of the plant to be tested appears around 50, it was considered that the signal intensity enrichment position of the plant to be tested is the same as that of the diploid nucleus, and the plant to be tested was diploid The identification results were counted and the induction rate was calculated according to the following formula: induction rate (%)=(number of maternal haploid plants/total number of plants)×100. As can be seen, after gene AtDMP8 mutation, gene AtDMP9 mutation, and simultaneous mutation of genes AtDMP8 and AtDMP9, they were subjected to hybridization with other materials, and female parent haploid may be obtained in an offspring.

TABLE 4

Haploid induction rate statistics in cross-species offspring of dmp mutants

| Hybridization combination | Plant number | Total plant number | Number of haploids | Haploid induction rate (%) |
| --- | --- | --- | --- | --- |
| ms1 × WT | T1-13 | 1171 | 0 | 0.00 |
| | T1-17 | 1339 | 0 | 0.00 |
| | Total | 2510 | 0 | 0.00 |
| ms1 × dmp8 | T1-34 | 1309 | 1 | 0.08 |
| | T2-33-1 | 1006 | 0 | 0.00 |
| | T2-33-2 | 719 | 0 | 0.00 |
| | Total | 3034 | 1 | 0.03 |
| ms1 × dmp9 | T2-33-4 | 844 | 3 | 0.36 |
| | T2-33-5 | 598 | 3 | 0.50 |
| | T2-33-6 | 589 | 2 | 0.34 |
| | Total | 2031 | 8 | 0.39 |
| ms1 × dmp8dmp9 | T1-6 | 146 | 2 | 1.37 |
| | T1-11 | 169 | 4 | 2.37 |
| | T1-19 | 194 | 6 | 3.09 |
| | T1-24 | 68 | 3 | 4.41 |
| | T1-25 | 361 | 11 | 3.05 |
| | T1-28 | 327 | 3 | 0.92 |
| | T1-32 | 31 | 1 | 3.23 |
| | T2-38-1 | 851 | 17 | 2.00 |
| | T2-38-2 | 559 | 10 | 1.79 |
| | Total | 2706 | 57 | 2.11 |

Example 2. Preparation of SlDMP Knockout Tomato Mutants and Application Thereof

I. Gene SlDMP was Knocked Out Using the CRISPR/Cas9 System

Gene SlDMP in the tomato was knocked out by using a CRISPR/Cas9 system to obtain a gene SlDMP knockout tomato mutant. The specific steps were as follows:

1. Selection of sgRNA Sequences

A target site sequence was designed on gene SlDMP and was 20 bp in length.

The target site 1 was located at positions 76-95 of SEQ ID No. 5, and the sequence of sgRNA target site 1 was TATCTCACTAATTACCACA (SEQ ID NO.100).

Target site 2 was located at positions 247-266 of SEQ ID No. 5, and the sequence of sgRNA target site 2 was TCTCCTTTTACCAAATACTGA (SEQ ID NO.101).

2. Construction of CRISPR/Cas9 Vector

The CRISPR/Cas9 vector is a recombinant vector (vector structure diagram shown in FIG. 9A) obtained by connecting a DNA molecule represented by SEQ ID No. 8 (sgRNA expression element), a DNA molecule represented by SEQ ID No. 11 (Cas9 expression element), a DNA molecule represented by SEQ ID No. 10 (fluorescent protein expression element), and a DNA molecule represented by SEQ ID No. 12 (NptII expression element) to a pICSL4723 vector through a golden gate method. The DNA molecule shown in SEQ ID No. 8 sequentially comprised a coding sequence of sgRNA targeted to the target site 1, a coding sequence of sgRNA targeted to the target site 2, with an AtU6-26 promoter used for initiating the expression of the coding sequence of sgRNA found near the beginning of each sgRNA coding sequence.

3. Acquisition of Transgenic Plants

The CRISPR/Cas9 vector obtained in step 2 was transformed into *Agrobacterium* competent cells GV3101 through heat shock (*Agrobacterium* GV3101 competent cells were purchased from Beijing Aosen Dingxin Biotechnology Co., Ltd., and publicly available) to obtain a recombinant strain GV3101/CRISPR/Cas9.

Then the cotyledon explant of wild tomato AC was infected with the recombinant strain GV3101/CRISPR/Cas9 by adopting a transformation method of infecting tomato cotyledon explant with *Agrobacterium* (i.e. the recombinant *Agrobacterium* was subjected to expanding propagation at 28° C., and tomato cotyledon explant was infected with the propagated *Agrobacterium* solution), and T0 generation transgenic tomato cotyledon explant plant was obtained after kanamycin resistance screening.

4. Identification of Transgenic Plants with Mutation of Gene SlDMP

Leaves of the T0 generation transgenic tomato plant obtained in step 3 were collected, genomic DNA was extracted as a template, and PCR amplification was conducted by adopting the following primers, to obtain PCR amplification products of different lines. The sequences of the primers for detecting gene SlDMP mutant sequence were as follows:

```
SlDMPF2:
                               (SEQ ID NO. 102)
ACTGCTTAGGATATTAACTGACCC;

SlDMPR1:
                               (SEQ ID NO. 103)
TTTTGGCACATCGACACCAAG.
```

The PCR amplification products of different lines were subjected to Sanger sequencing, and the sequencing results were compared with gene SlDMP of wild-type tomato AC. The genotype of SlDMP was identified according to the following principles.

If the sequence had a doublet characteristic from the target site sequence, the genotype of the line was a heterozygous genotype (i.e. gene SlDMP mutated on one of the two homologous chromosomes, and unmutated on the other chromosome), and the line was a T0 generation transgenic tomato heterozygous mutant line;

For a sequence with specific singlet characteristics from the target site sequence, if it was the same as the gene sequence of SlDMP of wild-type tomato AC, the genotype of the line was wild-type, that is there was no mutation on the gene sequence of SlDMP; if it was different from the gene sequence of SlDMP of the wild-type tomato AC, the genotype of the line is homozygous (the genes SlDMP mutated on both homologous chromosomes), the line was a T0 generation transgenic tomato homozygous mutant line.

TABLE 5

Gene SlDMP mutation types in T0 generation transgenic tomato

| Serial Number | Genotype | allele 1 | allele2 |
|---|---|---|---|
| T0-1 | Wild-type | WT | WT |
| T0-2 | Wild-type | WT | WT |
| T0-3 | Wild-type | WT | WT |
| T0-4 | Wild-type | WT | WT |
| T0-5 | Wild-type | WT | WT |
| T0-6 | Wild-type | WT | WT |
| T0-6 | Wild-type | WT | WT |
| T0-7 | Wild-type | WT | WT |
| T0-8 | Wild-type | WT | WT |
| T0-9 | Heterozygous mutation | TATCCTACTAATTTAC (SEQ ID NO. 104) (-3 bp)AAGGGG AAAAA (SEQ ID NO. 105) | WT |
| T0-10 | Biallelic mutation | TATCCTACTA (SEQ ID NO. 106) (-167 bp)TTTGGT AAAGG (SEQ ID NO. 107) | TACTAATTTACC (SEQ ID NO. 108) (-158 bp)TATTTGGTAA (SEQ ID NO. 109) |
| T0-11 | Heterozygous mutation | WT | TAATTTACC(C)ACAAGGT---ACT TCCC(-3 bp) GTATTTG |
| T0-12 | Heterozygous mutation | WT | TAATTTACC(C)ACAAGGT---TCC CTCAGT(-3 bp) TGGTAAAG |
| T0-12 | Heterozygous mutation | WT | TAATTTACC(C)ACAAGGT---TCC CTCAGT(-3 bp) TGGTAAAG |
| T0-13 | Wild-type | WT | WT |
| T0-14 | Heterozygous mutation | ACTAATTTACC (SEQ ID NO. 110) (-157 bp)GTATTT GGTAA (SEQ ID NO. 111) | WT |
| T0-15 | Wild-type | WT | WT |
| T0-16 | Wild-type | WT | WT |
| T0-16 | Wild-type | WT | WT |
| T0-17 | Wild-type | WT | WT |
| T0-17 | Wild-type | WT | WT |
| T0-18 | Wild-type | WT | WT |

TABLE 5-continued

Gene SlDMP mutation types in T0 generation transgenic tomato

| Serial Number | Genotype | allele 1 | allele2 |
|---|---|---|---|
| T0-18 | Wild-type | WT | WT |
| T0-19 | Wild-type | WT | WT |
| T0-20 | Wild-type | WT | WT |
| T0-21 | Wild-type | WT | WT |
| T0-21 | Wild-type | WT | WT |
| T0-22 | Wild-type | WT | WT |
| T0-22 | Wild-type | WT | WT |
| T0-24 | Wild-type | WT | WT |
| T0-24 | Wild-type | WT | WT |
| T0-25 | Wild-type | WT | WT |
| T0-26 | Wild-type | WT | WT |
| T0-27 | Wild-type | WT | WT |
| T0-28 | Wild-type | WT | WT |
| T0-29 | Wild-type | WT | WT |
| T0-31 | Wild-type | WT | WT |
| T0-32 | Wild-type | WT | WT |
| T0-33 | Wild-type | WT | WT |
| T0-34 | Biallelic mutation | TACTAATTTACC (SEQ ID NO. 112) (-157 bp)GTATTT GGTAA (SEQ ID NO. 113) | AATTTACC(C)ACAAGGT---CTTC CCTCA(A) GTATT |

Note:
"-" stands for base deletion.

5. Identification of T1 Generation Transgenic Tomato Genotyping

T0 transgenic tomato gene SlDMP mutant lines T0-33 and T0-34 obtained in step 4 were selfed, seeds were sowed after harvesting to obtain T1 generation transgenic tomato. The specific method for identifying the genotype of gene SlDMP of T1 generation transgenic tomato was as follows: with the genomic DNA of T1 transgenic tomato as a template, the genotype of gene SlDMP of T1 transgenic tomato was identified by using mutant sequence detection primers of SlDMP (SlDMPF2 and SlDMPR1) according to the method in step 4, respectively.

The finally obtained T1 generation transgenic tomato gene SlDMP homozygous mutant lines comprised sldmp-1 and sldmp-2, with the mutation types of each line as follows:

Sequencing identification showed that: the difference between the genomic DNA of T1 generation transgenic tomato genes SlDMP homozygosis mutant lines sldmp-1 and the genomic DNA of the wild-type tomato AC only lies in that in a gene encoding SlDMP protein, a base (C) insertion occurred at positions 92-93 of SEQ ID No. 5.

Sequencing identification showed that: the difference between the genomic DNA of T1 generation transgenic tomato genes SlDMP homozygosis mutant lines sldmp-2 and the genomic DNA of the wild-type tomato AC only lies in that in a gene encoding SlDMP protein, a fragment deletion occurred at positions 93-249 of SEQ ID No. 5.

II. Application of Gene SlDMP Knockout Tomato Mutant Inducing the Haploid Generation (A) Plant performance and seed setting rate of SlDMP knockout tomato mutants Comparing the performance of the tomato mutant plants with gene SlDMP knocked out in the context of wild-type tomato AC and AC, it was found that the knockout of the gene SlDMP does not affect the growth of the plant (FIGS. 6A-6D). The number of seeds per tomato selfed fruit was counted, with an average of about 79.5 seeds per selfed fruit for the wild-type, whereas the sldmp mutant produced only 17 seeds, significantly lower than that of the wild-type (Table 6). The results showed that the mutation of gene SlDMP resulted in the decrease of seed setting rate, suggesting that the sldmp mutant has the ability of haploid induction.

TABLE 6

Number of selfed seeds of sldmp mutants statistics

| Materials | Number of ears statistics | Number of average seed setting |
|---|---|---|
| WT | 12 | 79.5 ± 24.1 |
| sldmp-1 | 14 | 19.7 ± 7.1 |
| sldmp-2 | 23 | 15.3 ± 6.6 |

Note:
WT is wild-type tomato AC.

(B) Identification of Hybridization Induction Ability of Gene SlDMP Knockout Tomato Mutants The sldmp mutants were crossed with $F_1$ generation material obtained by crossing tomato AC and Micro-Tom to obtain cross-species offspring, and the haploids in the cross-species offspring were identified by the following methods:

1. Fluorescent Labeling Identification

The CRISPR/Cas9 vector carried the expression element of TagRFP (Entacmaea quadricolor) driven by the promoter AtOLEO1. Since the promoter AtOLEO1 was specifically expressed in mature seed embryos, the fluorescent signal of TagRFP may be observed by fluorescent light. Therefore, the mutant carrying the expression element as a male parent was hybridized with other non-fluorescent female parent materials to obtain seeds, wherein embryos of diploid seeds red fluorescence due to having the genome of the male parent, while embryos of haploid seeds showed no fluorescence or weak fluorescence due to being derived from the female parent (FIGS. 7A-7D).

2. Molecular marker identification

The seeds with no fluorescence identified in step 1 were further planted, the genomic DNA was extracted, and PCR amplification was conducted adopting with polymorphic primers SlDMPF2+SlDMPR1 between the $F_1$ generation obtained by crossing tomato AC with Micro-Tom and the gene SlDMP knockout tomato mutant, and the amplified product was subjected to agarose banding pattern detection or sequencing if the amplified product of the single plant to be tested showed 1 band or the sequencing result showed a single peak graph, it was considered the single plant band to be a female parent banding pattern without banding pattern of the male parent material, the single plant was the female parent haploid. And if the amplification product of the single plant to be tested showed two bands or the sequencing result showed a heterozygous peak graph, it was considered the single plant band to be a heterozygous banding pattern of the $F_1$ generation obtained by crossing AC and the Micro-Tom of the tomato and the gene SlDMP knockout tomato mutant, and the single plant was a normal cross-species offspring and diploid.

3. Identification of Mature Plants Phenotype

The phenotypes of the plants identified in steps 1 and 2 were further observed, with haploidy showed dwarf, narrow leaves growing upward, compact plant type, and male sterility, while diploid showed high plant, broad, and scattered leaves, and normal fertility.

4. Leaf Identification by Flow Cytometry

Flow cytometry was conducted on the plant with the haploid character obtained in step 3, wherein the specific method was as follows: cell nuclei of young leaves of a plant to be tested was extracted, and diploid *Arabidopsis thaliana* leaves were used as a control; the signal was then detected by a flow cytometry instrument, the diploid nuclear signal was firstly detected, and the diploid nuclear signal peak position was set at 100 (since the genetic materials in diploid cells were twice that in haploid cells, the haploid nuclear signal peak position appeared around 50). And if the nuclear signal peak position of the plant to be tested appears around 50, the plant to be tested is considered to be a haploid plant. If the signal peak of the plant to be tested appears around 100, it was considered that the signal intensity enrichment position of the plant to be tested is the same as that of the diploid nucleus, and the plant to be tested was diploid (FIG. 8).

The identification results were counted and the induction rate was calculated according to the following formula: induction rate (%)=(number of maternal haploid plants/total number of plants)×100. After gene SlDMP mutation, crossing with other materials was conducted, a female parent haploid may be obtained in the cross-species offspring.

TABLE 7

Haploid induction rate statistics in cross-species offspring of sldmp mutants

| Hybridization combination | Total plant number | Number of haploids | Haploid induction rate (%) |
|---|---|---|---|
| $F_1$ × WT | 954 | 0 | 0.00 |
| $F_1$ × sldmp-1 | 323 | 2 | 0.62 |
| $F_1$ × sldmp-2 | 629 | 3 | 0.99 |

Note:
$F_1$ is the cross-species offspring of between tomato AC and Micro-Tom, and WT is wild-type tomato AC.

INDUSTRIAL APPLICATIONS

The parthenogenetic haploid induction genes AtDMP8 and AtDMP9 are cloned from *Arabidopsis thaliana*. Experiments have shown that mutations of AtDMP8 and AtDMP9 can produce parthenogenetic haploid inducibility, to enable dicotyledonous crops to be induced to produce haploids via parthenogenetic means. The present invention was further verified in tomatoes, and it was also found in tomatoes that the mutation of SlDMP can produce parthenogenetic haploid inducibility. The invention lays an important foundation for broadening the application of haploid breeding technology on dicotyledonous plants and revealing the biological mechanism of parthenogenetic haploid production. Given the universality of the utilization of haploid breeding technology in the current breeding industry, the invention has very wide application space and market prospects.

The invention claimed is:

1. A method for preparing a plant haploid inducer line is as follows A1) or A2):

A1) knocking out the gene AtDMP8 and gene AtDMP9 in the *Arabidopsis thaliana* genome to obtain a transgenic *Arabidopsis thaliana*, namely the *Arabidopsis thaliana* haploid inducer line;

A2) knocking out the gene SlDMP in the tomato genome to obtain a transgenic tomato, namely the tomato haploid inducer line; wherein the protein encoded by the gene AtDMP8 is a protein shown in SEQ ID NO: 2, or a protein having 85% or more identity with the amino acid sequence shown in SEQ ID NO. 2and having the same function, or a fusion protein obtained by attaching a tag to the N-terminus and/or C-terminus of the protein shown in SEQ ID NO. 2;

the protein encoded by the gene AtDMP9 is a protein shown in SEQ ID NO: 4, or a protein having 85% or more identity with the amino acid sequence shown in SEQ ID NO. 4 and having the same function, or a fusion protein obtained by attaching a tag to the N-terminus and/or C-terminus of the protein shown in SEQ ID NO. 4; and the protein encoded by the gene SlDMP is a protein shown in SEQ ID NO: 6, or a protein having 85% or more identity with the amino acid sequence shown in SEQ ID NO. 6 and having the same function, or a fusion protein obtained by attaching a tag to the N-terminus and/or C-terminus of the protein shown in SEQ ID NO. 6.

2. The method according to claim 1, wherein, the gene AtDMP8 is a cDNA molecule or a genomic DNA molecule shown in SEQ ID NO. 1 or a cDNA molecule or a genomic DNA molecule having 85% or more identity to SEQ ID NO. 1, or a cDNA molecule or a genomic DNA molecule that hybridizes with SEQ ID NO. 1 under stringent conditions;

the gene AtDMP9 is a cDNA molecule or a genomic DNA molecule shown in SEQ ID NO. 3, or a cDNA molecule or a genomic DNA molecule having 85% or more identity to SEQ ID NO. 3, or a cDNA molecule or a genomic DNA molecule that hybridizes with SEQ ID NO. 3 under stringent conditions;

the gene SlDMP is a cDNA molecule or a genomic DNA molecule shown in SEQ ID NO. 5, or a cDNA molecule or a genomic DNA molecule having 85% or more identity to SEQ ID NO. 5, or a cDNA molecule or a genomic DNA molecule that hybridizes with SEQ ID NO. 5 under stringent conditions;

the genes AtDMP8 and AtDMP9 have the following functions: the *Arabidopsis* becomes an *Arabidopsis* haploid inducer line when the genes AtDMP8 and AtDMP9 are silenced or inhibited or knocked out therein; and the gene SlDMP has the following functions: the tomato becomes a tomato haploid inducer line when the gene SlDMP is knocked out therein.

3. The method according to claim 1, wherein, the said knocking out gene AtDMP8 and gene AtDMP9 or said knocking out gene SlDMP is by CRISPR/Cas9.

4. The method according to claim 3, wherein, when selecting *Arabidopsis thaliana*, the target site of the CRISPR/Cas9 is located at positions 98-117 of SEQ ID NO. 1, positions 290-309 of SEQ ID NO. 3, positions 368-387 of SEQ ID NO. 3 and positions 509-528 of SEQ ID NO. 1.

5. The method according to claim 3, wherein, when selecting tomato, the target site of the CRISPR/Cas9 is located at positions 76-95 of SEQ ID NO. 5, positions 247-266 of SEQ ID NO. 5.

6. The method according to claim 1, wherein, the plant haploid inducer line specifically comprises an *Arabidopsis thaliana* mutant line T1-34, an *Arabidopsis thaliana* mutant line T1-6, an *Arabidopsis thaliana* mutant line T1-11, an *Arabidopsis thaliana* mutant line T1-19, an *Arabidopsis thaliana* mutant line T1-24, an *Arabidopsis thaliana* mutant line T1-25, an *Arabidopsis thaliana* mutant line T1-28, or an *Arabidopsis thaliana* mutant line T1-32;

the difference between the genomic DNA of the *Arabidopsis thaliana* mutant line T1-34 and the genomic DNA of the wild-type *Arabidopsis thaliana* Col-0 only lies in that in a gene encoding protein AtDMP8, a fragment deletion occurs in one chromosome at positions 115-512 of SEQ ID NO. 1, and a base (T) insertion occurs in the other chromosome at positions 114-115 of SEQ ID NO. 1;

the difference between the genomic DNA of the *Arabidopsis thaliana* mutant line T1-6 and the genomic DNA of the wild-type *Arabidopsis thaliana* Col-0 only lies in that in a gene encoding protein AtDMP8, a fragment deletion occurs in one chromosome at positions 115-512 of SEQ ID NO. 1, and a fragment deletion occurs in the other chromosome at positions 113-114 of SEQ ID NO. 1; and in a gene encoding protein AtDMP9, a fragment insertion occurs in both chromosomes at positions 160-161 of SEQ ID NO. 3, with the nucleotide sequence of the inserted fragment shown as SEQ ID NO. 13;

the difference between the genomic DNA of the *Arabidopsis thaliana* mutant line T1-11 and the genomic DNA of the wild-type *Arabidopsis thaliana* Col-0 only lies in that in a gene encoding protein AtDMP8, a base (T) insertion occurs at positions 114-115 of SEQ ID NO. 1, and in a gene encoding protein AtDMP9, a base (T) insertion occurs in one chromosome at positions 160-161 of SEQ ID NO. 3, and a fragment insertion occurs in the other chromosome at positions 160-161 of SEQ ID NO. 3, with the nucleotide sequence of the inserted fragment shown as SEQ ID NO. 13;

the difference between the genome of the *Arabidopsis thaliana* mutant line T1-19 and the genome of the wild-type *Arabidopsis thaliana* Col-0 only lies in that in a gene encoding protein AtDMP8, a base (T) deletion occurs in one chromosome at position 114 of SEQ ID NO. 1, and a fragment deletion occurs in the other chromosome at positions 115-511 of SEQ ID NO. 1, and in a gene encoding protein AtDMP9, a fragment deletion occurs in one chromosome at positions 161-560 of SEQ ID NO. 3, and a fragment deletion occurs in the other chromosome at positions 161-564 of SEQ ID NO. 3;

the difference between the genomic DNA of the *Arabidopsis thaliana* mutant line T1-24 and the genomic DNA of the wild-type Arabidopsis thaliana Col-0 only lies in that in a gene encoding protein AtDMP8, a fragment deletion occurs in one chromosome at positions 115-512 of SEQ ID NO. 1, and a base (T) insertion occurs in the other chromosome at positions 114-115 of SEQ ID NO. 1, and in a gene encoding protein AtDMP9, a fragment deletion occurs in one chromosome at positions 161-560 of SEQ ID NO. 3, and a fragment deletion occurs in the other chromosome at positions 159-160 of SEQ ID NO. 3;

the difference between the genomic DNA of the *Arabidopsis thaliana* mutant line T1-25 and the genomic DNA of the wild-type *Arabidopsis thaliana* Col-0 only lies in that in a gene encoding protein AtDMP8, a base (T) deletion occurs in one chromosome at position 114 of SEQ ID NO. 1, and a fragment CGT insertion occurs in the other chromosome at positions 114-115 of SEQ ID NO. 1; and in a gene encoding protein AtDMP9, a fragment deletion occurs in one chromosome at positions 161-162 of SEQ ID NO. 3, and a base (A) insertion occurs in the other chromosome at positions 160-161 of SEQ ID NO. 3;

the difference between the genomic DNA of the *Arabidopsis thaliana* mutant line T1-28 and the genomic DNA of the wild-type *Arabidopsis thaliana* Col-0 only lies in that in a gene encoding protein AtDMP8, a fragment deletion occurs in one chromosome at positions 115-512 of SEQ ID NO. 1, and a base (T) deletion occurs in the other chromosome at position 114 of SEQ ID NO. 1, and in a gene encoding protein AtDMP9, and a base (A) insertion occurs in both chromosomes at positions 160-161 of SEQ ID NO. 3; and the difference between the genomic DNA of the Arabidopsis thaliana mutant line T1-32 and the genomic DNA of the wild-type Arabidopsis thaliana Col-0 only lies in that in a gene encoding protein AtDMP8, a fragment deletion occurs in one chromosome at positions 115-511 of SEQ ID NO. 1, and a base (T) insertion occurs in the other chromosome at positions 114-115 of SEQ ID NO. 1, and in a gene encoding protein AtDMP9, and a base (C) deletion occurs in both chromosomes at position 161 of SEQ ID NO. 3.

7. The method according to claim 1, wherein the method further comprising the step of producing the offspring of the plant haploid inducer line: selfing the plant haploid inducer line.

8. The method according to claim 7, wherein, the plant haploid inducer line is an *Arabidopsis thaliana* mutant line T2-33, an *Arabidopsis thaliana* mutant line T2-38, a tomato mutant line sldmp-1 or a tomato mutant line sldmp-2;

the difference of the genomic DNA of the *Arabidopsis thaliana* mutant line T2-33 and the wild-type *Arabidopsis thaliana* Col-0 only lies in that in a gene encoding protein AtDMP9, a base (T) insertion occurs in both chromosomes at positions 160-161 of SEQ ID NO. 3, and a fragment insertion occurs in both chromosomes at positions 561-562 of SEQ ID NO. 3, with the nucleotide sequence of the inserted fragment shown as SEQ ID NO. 14;

the difference between the genomic DNA of the *Arabidopsis thaliana* mutant line T2-38 and the genomic DNA of the wild-type *Arabidopsis thaliana* Col-0 only lies in that in a gene encoding protein AtDMP8, a fragment deletion occurs in both chromosomes at positions 115-127 of SEQ ID NO. 1, and in a gene encoding protein AtDMP9, a base (T) and a base (G) insertion occurs in both chromosomes at positions 160-161 of SEQ ID NO. 3 and positions 562-563 of SEQ ID NO. 3, respectively;

the difference between the genome DNA of the tomato mutant line sldmp-1 and the genome DNA of wild-type tomato AC only lies in that in a gene encoding SlDMP protein, and a base (C) insertion occurs in both chromosomes at positions 92-93 of SEQ ID NO. 5; and the difference between the genome DNA of the tomato mutant line sldmp-2 and the genome DNA of wild-type tomato AC only lies in that in a gene encoding protein SlDMP, a fragment deletion occurs in both chromosomes at positions 93-249 of SEQ ID NO. 5.

\* \* \* \* \*

SEQUENCE LISTING

<160> NUMBER OF SEQ ID NOS: 113

<210> SEQ ID NO 1
<211> LENGTH: 856
<212> TYPE: DNA

<213> ORGANISM: Arabidopsis thaliana

<400> SEQUENCE: 1

```
ccgtcgtact aaagatagtt cgaacaaaaa tccaaaacac atttctcatt tcacaaaaca      60
aacgaaaact attgagtcac aaaacacaga gagaatggag aaaacagagg aaagcgtcgg     120
aatcagagtt tacacgacga caacgacgca aaatccgtca ccaacatcgt ctcggtcgcc     180
caaacctgtc cctctctctt cactgcctat gcttccggca ggagccgccg cgggaggagg     240
aaaaggtaga aaacgtcgca tggtggcgaa aggagttcaa aaaacggttt cgaagacatc     300
aatgctcgtc aatttccttc cgacaggaac tctcttgatg ttcgaaatgg ttcttccgac     360
aatctaccgt gacggagact gtaacggaat caacacactc atgattcatc ttctcttgct     420
tctttgcgca atgtcttgtt cttcttcca tttcaccgac agtttcaaag cctccgatgg      480
gaaaatttac tacggttttg tgactccacg tggactcgcg gtgttcatga aaccacccte     540
gccggggttt ggaggcggag atgtgattgc agagaaggag attccggtga cggatgagag     600
gtataagttg agggttaatg actttgtgca ttcagtgatg agtgttttgg tttttatggc     660
gatcgcgttt tcggatcgga gagtcacagg gtgtttgttt ccaggaaaag agaaggagat     720
ggatcaagtt atggagagtt tccgttaat ggtcggaatt gtttgcagtg ctttgtttct      780
tgttttccg accagtcgat acggtgtcgg atgcatgtct acataataac taatttcact      840
tttctgttgt tttgtg                                                     856
```

<210> SEQ ID NO 2
<211> LENGTH: 243
<212> TYPE: PRT
<213> ORGANISM: Arabidopsis thaliana

<400> SEQUENCE: 2

```
Met Glu Lys Thr Glu Glu Ser Val Gly Ile Arg Val Tyr Thr Thr Thr
1               5                   10                  15

Thr Thr Gln Asn Pro Ser Pro Thr Ser Ser Arg Ser Pro Lys Pro Val
            20                  25                  30

Pro Leu Ser Ser Leu Pro Met Leu Pro Ala Gly Ala Ala Gly Gly
        35                  40                  45

Gly Lys Gly Arg Lys Arg Met Val Ala Lys Gly Val Gln Lys Thr
    50                  55                  60

Val Ser Lys Thr Ser Met Leu Val Asn Phe Leu Pro Thr Gly Thr Leu
65                  70                  75                  80

Leu Met Phe Glu Met Val Leu Pro Thr Ile Tyr Arg Asp Gly Asp Cys
                85                  90                  95

Asn Gly Ile Asn Thr Leu Met Ile His Leu Leu Leu Leu Cys Ala
            100                 105                 110

Met Ser Cys Phe Phe Phe His Phe Thr Asp Ser Phe Lys Ala Ser Asp
        115                 120                 125

Gly Lys Ile Tyr Tyr Gly Phe Val Thr Pro Arg Gly Leu Ala Val Phe
    130                 135                 140

Met Lys Pro Pro Ser Pro Gly Phe Gly Gly Gly Asp Val Ile Ala Glu
145                 150                 155                 160

Lys Glu Ile Pro Val Thr Asp Glu Arg Tyr Lys Leu Arg Val Asn Asp
                165                 170                 175

Phe Val His Ser Val Met Ser Val Leu Val Phe Met Ala Ile Ala Phe
            180                 185                 190

Ser Asp Arg Arg Val Thr Gly Cys Leu Phe Pro Gly Lys Glu Lys Glu
```

```
                195                 200                 205
Met Asp Gln Val Met Glu Ser Phe Pro Leu Met Val Gly Ile Val Cys
        210                 215                 220
Ser Ala Leu Phe Leu Val Phe Pro Thr Ser Arg Tyr Gly Val Gly Cys
225                 230                 235                 240
Met Ser Thr
```

<210> SEQ ID NO 3
<211> LENGTH: 992
<212> TYPE: DNA
<213> ORGANISM: Arabidopsis thaliana

<400> SEQUENCE: 3

```
cgatgaaact ctataaccgt caataaccgc cgcgatttga aaaataaata caaaaatctc    60
attctccatt aaaccattta acacaacata cgaaaaactg gtaaatcaca aagaaaaaa   120
acagagagaa acacacgaaa atggagaaaa cagaggaaag cgtcggaatc agagtttaca   180
cggcgactcc gccgcaaaaa ccatcaccat caccaccttc tcgttcacca aaacccgtct   240
taatctcttc attgccttcc ctcccgtcag gagccgccgc tggaggagga agaggtcgaa   300
aacgtcgcat ggtggcgcaa ggagttcaaa aaacggtttc gaagacatca atgctcgtca   360
acttccttcc gacaggaaca ctcttgatgt tcgaaatggt tcttccatca atataccgtg   420
acggagactg taacgaatc aacacactca tgattcatct cctcttgctt ctttgcgcaa   480
tgtcttgttt cttcttccat tttaccgaca gtttcaaagc atccgatggg aagatctact   540
acggtttcgt gacgccacgt ggactcgcgg tgttcatgaa accgccgcct ccagagtttg   600
gtggcggaga tgttatagcg gaggcagaga ttccggtgac tgatgatagg tataagttga   660
cggttaatga cttgttcat gcagtgatga gcgttttggt gtttatggcg attgcgtttt   720
cggatcgaag agtcacggga tgtttgtttc cagggaaaga gaaagagatg gatcaagtta   780
tggagagttt tccaataatg gttggaattg tttgtagtgc tttgtttctt gttttccga   840
ccactcgata tggtgttggt tgcatgactg gttaatttat tttcactttt ctgttttttg   900
gtttgtttta gtatctattt cgtatttcc ttgtaattta gattatctga tttaaactcc   960
aatgttctac tatttttatc tattgtattg tt                                992
```

<210> SEQ ID NO 4
<211> LENGTH: 244
<212> TYPE: PRT
<213> ORGANISM: Arabidopsis thaliana

<400> SEQUENCE: 4

```
Met Glu Lys Thr Glu Glu Ser Val Gly Ile Arg Val Tyr Thr Ala Thr
1               5                   10                  15

Pro Pro Gln Lys Pro Ser Pro Ser Pro Ser Arg Ser Pro Lys Pro
            20                  25                  30

Val Leu Ile Ser Ser Leu Pro Ser Leu Pro Ser Gly Ala Ala Ala Gly
        35                  40                  45

Gly Gly Arg Gly Arg Lys Arg Arg Met Val Ala Gln Gly Val Gln Lys
    50                  55                  60

Thr Val Ser Lys Thr Ser Met Leu Val Asn Phe Leu Pro Thr Gly Thr
65                  70                  75                  80

Leu Leu Met Phe Glu Met Val Leu Pro Ser Ile Tyr Arg Asp Gly Asp
                85                  90                  95

Cys Asn Gly Ile Asn Thr Leu Met Ile His Leu Leu Leu Leu Leu Cys
```

```
                100                 105                 110
Ala Met Ser Cys Phe Phe Phe His Phe Thr Asp Ser Phe Lys Ala Ser
            115                 120                 125

Asp Gly Lys Ile Tyr Tyr Gly Phe Val Thr Pro Arg Gly Leu Ala Val
            130                 135                 140

Phe Met Lys Pro Pro Pro Glu Phe Gly Gly Asp Val Ile Ala
145                 150                 155                 160

Glu Ala Glu Ile Pro Val Thr Asp Asp Arg Tyr Lys Leu Thr Val Asn
                165                 170                 175

Asp Phe Val His Ala Val Met Ser Val Leu Val Phe Met Ala Ile Ala
            180                 185                 190

Phe Ser Asp Arg Arg Val Thr Gly Cys Leu Phe Pro Gly Lys Glu Lys
            195                 200                 205

Glu Met Asp Gln Val Met Glu Ser Phe Pro Ile Met Val Gly Ile Val
            210                 215                 220

Cys Ser Ala Leu Phe Leu Val Phe Pro Thr Thr Arg Tyr Gly Val Gly
225                 230                 235                 240

Cys Met Thr Gly

<210> SEQ ID NO 5
<211> LENGTH: 757
<212> TYPE: DNA
<213> ORGANISM: Solanum lycopersicum

<400> SEQUENCE: 5
atggagcaaa ctagtgaagg aattggaata aaaatgtata gtacatcgaa acgcgtcgat      60
aattcatcgt ctatgtatcc tactaattta ccacaaggtg aaataatccc agaattacca     120
ataccaattg gtggtaaaaa agaagagca atggcaaatg gtgtacaaaa acactttca      180 aaaacttcat tacttgttaa ttttctccca acgggaaccc ttttaacatt tgaaatgtta     240
cttccctcag tatttggtaa aggagattgt tcaccaatta ctacatttat gattttaacg     300
ttacttggac tttgtacttt gtcatgtttt ttctttcatt ttaccgatag ttttcgaggt     360
cctgatggta aaatttacta tggttttgtt acaccaagag gtttgaaagt tttcaagact     420
ggacttggtg tcgatgtgcc aaaagatgaa aggtacattg tgggagtgac agattttgta     480
catgcaatga tgtctgtttt ggtgtttgtg gcaattgcat tttctgatca gagagtaaca     540
ctttgtctat ttcctggaca tgctaaagaa cttgatgaaa ttatgaggag ttttccatta     600
atggttggag ttatttgtag tggacttttt cttgtttttc ctaattcgag atatggtgtt     660
ggatgtatgt ctgcttagat atctacgttt acattctttc atgtattgta atatacgttg     720
gttgatattt atttaaaatc tatctatctt gtattga                               757

<210> SEQ ID NO 6
<211> LENGTH: 225
<212> TYPE: PRT
<213> ORGANISM: Solanum lycopersicum

<400> SEQUENCE: 6

Met Glu Gln Thr Ser Glu Gly Ile Gly Ile Lys Met Tyr Ser Thr Ser
1               5                   10                  15

Lys Arg Val Asp Asn Ser Ser Ser Met Tyr Pro Thr Asn Leu Pro Gln
            20                  25                  30

Gly Glu Ile Ile Pro Glu Leu Pro Ile Pro Ile Gly Gly Lys Lys Arg
        35                  40                  45
```

```
Arg Ala Met Ala Asn Gly Val Gln Lys Thr Leu Ser Lys Thr Ser Leu
 50                  55                  60

Leu Val Asn Phe Leu Pro Thr Gly Thr Leu Leu Thr Phe Glu Met Leu
 65                  70                  75                  80

Leu Pro Ser Val Phe Gly Lys Gly Asp Cys Ser Pro Ile Thr Thr Phe
                 85                  90                  95

Met Ile Leu Thr Leu Leu Gly Leu Cys Thr Leu Ser Cys Phe Phe Phe
                100                 105                 110

His Phe Thr Asp Ser Phe Arg Gly Pro Asp Gly Lys Ile Tyr Tyr Gly
                115                 120                 125

Phe Val Thr Pro Arg Gly Leu Lys Val Phe Lys Thr Gly Leu Gly Val
                130                 135                 140

Asp Val Pro Lys Asp Glu Arg Tyr Ile Val Gly Val Thr Asp Phe Val
145                 150                 155                 160

His Ala Met Met Ser Val Leu Val Phe Val Ala Ile Ala Phe Ser Asp
                165                 170                 175

His Arg Val Thr Leu Cys Leu Phe Pro Gly His Ala Lys Glu Leu Asp
                180                 185                 190

Glu Ile Met Arg Ser Phe Pro Leu Met Val Gly Val Ile Cys Ser Gly
                195                 200                 205

Leu Phe Leu Val Phe Pro Asn Ser Arg Tyr Gly Val Gly Cys Met Ser
    210                 215                 220

Ala
225

<210> SEQ ID NO 7
<211> LENGTH: 1447
<212> TYPE: DNA
<213> ORGANISM: Artificial Sequence
<220> FEATURE:
<223> OTHER INFORMATION: Synthesized

<400> SEQUENCE: 7
catcttcatt cttaagatat gaagataatc ttcaaaaggc ccctgggaat ctgaaagaag      60
agaagcaggc ccatttatat gggaaagaac aatagtattt cttatatagg cccatttaag    120
ttgaaaacaa tcttcaaaag tcccacatcg cttagataag aaaacgaagc tgagtttata    180
tacagctaga gtcgaagtag tgattgagaa acagaggaa agcgtgtttt agagctagaa     240
atagcaagtt aaaataaggc tagtccgtta tcaacttgaa aaagtggcac cgagtcggtg    300 cttttttttct agacccagct tcttgtaca aagttggcat tacgctttac gaattcccat    360
ggggagcatc ttcattctta agatatgaag ataatcttca aaaggcccct gggaatctga    420 agaagagaa gcaggcccat ttatatggga agaacaata gtatttctta tataggccca     480
tttaagttga aaacaatctt caaaagtccc acatcgctta gataagaaaa cgaagctgag    540
tttatataca gctagagtcg aagtagtgat tgaagaggtc gaaaacgtcg cagttttaga    600
gctagaaata gcaagttaaa ataaggctag tccgttatca acttgaaaaa gtggcaccga    660
gtcggtgctt ttttctaga cccagctttc ttgtacaaag ttggcattac gctcagagaa    720
ttcgcatgcg gagcatcttc attcttaaga tatgaagata tcttcaaaa ggcccctggg    780 aatctgaaag aagagaagca ggcccattta tatgggaaag aacaatagta tttcttatat    840
aggcccattt aagttgaaaa caatcttcaa agtcccaca tcgcttagat aagaaaacga    900
agctgagttt atatacagct agagtcgaag tagtgattgt caagagtgtt cctgtcggag    960
ttttagagct agaaatagca agttaaaata aggctagtcc gttatcaact tgaaaaagtg   1020
```

```
gcaccgagtc ggtgcttttt ttctagaccc agctttcttg tacaaagttg gcattacgct    1080
tgtggaattc gcatgcggag catcttcatt cttaagatat gaagataatc ttcaaaaggc    1140
ccctgggaat ctgaaagaag agaagcaggc ccatttatat gggaagaac aatagtattt     1200 cttatatagg cccatttaag ttgaaaacaa tcttcaaaag tcccacatcg cttagataag    1260
aaaacgaagc tgagtttata tacagctaga gtcgaagtag tgattgatga acaccgcgag    1320
tccacggttt tagagctaga aatagcaagt taaaataagg ctagtccgtt atcaacttga    1380
aaaagtggca ccgagtcggt gcttttttc tagacccagc tttcttgtac aaagttggca     1440
ttacgct                                                              1447

<210> SEQ ID NO 8
<211> LENGTH: 714
<212> TYPE: DNA
<213> ORGANISM: Artificial Sequence
<220> FEATURE:
<223> OTHER INFORMATION: Synthesized

<400> SEQUENCE: 8
catcttcatt cttaagatat gaagataatc ttcaaaaggc ccctgggaat ctgaaagaag      60
agaagcaggc ccatttatat gggaagaac aatagtattt cttatatagg cccatttaag     120
ttgaaaacaa tcttcaaaag tcccacatcg cttagataag aaaacgaagc tgagtttata    180
tacagctaga gtcgaagtag tgattgtatc ctactaattt accacagttt tagagctaga    240
aatagcaagt taaaataagg ctagtccgtt atcaacttga aaaagtggca ccgagtcggt    300 gcttttttc tagacccagc tttcttgtac aaagttggca ttacgcttgt ggaattcctc     360
gagggagcat cttcattctt aagatatgaa gataatcttc aaaaggcccc tgggaatctg    420
aaagaagaga agcaggccca tttatatggg aagaacaat agtatttctt ataggccc       480 atttaagttg aaaacaatct tcaaaagtcc cacatcgctt agataagaaa acgaagctga    540
gtttatatac agctagagtc gaagtagtga ttgtctcctt taccaaatac tgagttttag    600
agctagaaat agcaagttaa aataaggcta gtccgttatc aacttgaaaa agtggcaccg    660
agtcggtgct ttttttctag acccagcttt cttgtacaaa gttggcatta cgct          714

<210> SEQ ID NO 9
<211> LENGTH: 6137
<212> TYPE: DNA
<213> ORGANISM: Artificial Sequence
<220> FEATURE:
<223> OTHER INFORMATION: Synthesized

<400> SEQUENCE: 9
ctcaactttt gattcgctat ttgcagtgca cctgtggcgt tcatcacatc ttttgtggca     60
ctgtttgcac tggtcattgc tattacaaag gaccttcctg atgttgaagg agatcgaaag    120
taagtaactg cacgcataac cattttcttt ccgctctttg gctcaatcca tttgacagtc    180
aaagacaatg tttaaccagc tccgtttgat atattgtctt tatgtgtttg ttcaagcatg    240
tttagttaat catgcctttg attgatcttg aataggttcc aaatatcaac cctggcaaca    300
aaacttggag tgagaaacat tgcattcctc ggttctggac ttctgctagt aaattatgtt    360
tcagccatat cactagcttt ctacatgcct caggtgaatt catctatttc cgtcttaact    420
atttcggtta attaaagcac gaacaccatt actgcatgta gagcttgat aaactatcgc     480 caccaattta ttttttgttgc gatattgtta ctttcctcag tatgcagctt tgaaaagacc    540
```

```
aaccctctta tcctttaaca atgaacaggt ttttagaggt agcttgatga ttcctgcaca    600
tgtgatcttg gcttcaggct taattttcca ggtaaagcat tatgagatac tcttatatct    660
cttacatact tttgagataa tgcacaagaa cttcataact atatgcttta gtttctgcat    720
ttgacactgc caaattcatt aatctctaat atctttgttg ttgatctttg gtagacatgg    780
gtactagaaa aagcaaacta caccaaggta aaatactttt gtacaaacat aaactcgtta    840
tcacggaaca tcaatggagt gtatatctaa cggagtgtag aaacatttga ttattgcagg    900
aagctatctc aggatattat cggtttatat ggaatctctt ctacgcagag tatctgttat    960
tccccttcct ctagctttca atttcatggt gaggatatgc agttttcttt gtatatcatt   1020
cttcttcttc tttgtagctt ggagtcaaaa tcggttcctt catgtacata catcaaggat   1080
atgtccttct gaattttttat atcttgcaat aaaaatgctt gtaccaattg aaacaccagc   1140
tttttgagtt ctatgatcac tgacttggtt ctaaccaaaa aaaaaaaaat gtttaattta   1200
catatctaaa agtaggttta gggaaaccta acagtaaaa tatttgtata ttattcgaat    1260
ttcactcatc ataaaaactt aaattgcacc ataaaatttt gttttactat taatgatgta   1320
atttgtgtaa cttaagataa aaataatatt ccgtaagtta accggctaaa accacgtata   1380
aaccagggaa cctgttaaac cggttcttta ctggataaag aaatgaaagc ccatgtagac   1440
agctccatta gagcccaaac cctaaatttc tcatctatat aaaaggagtg acattagggt   1500
ttttgttcgt cctcttaaag cttctcgttt tctctgccgt ctctctcatt cgcgcgacgc   1560
aaacgatctt caggtgatct tctttctcca aatcctctct cataactctg atttcgtact   1620
tgtgtatttg agctcacgct ctgtttctct caccacagcc tactgtattt ttacaacaat   1680
taccaacaac aacaaacaac aaacaacatt acaattacta tttacaatta caatggataa   1740
gaagtactct atcggactcg atatcggaac taactctgtg ggatgggctg tgatcaccga   1800
tgagtacaag gtgccatcta agaagttcaa ggttctcgga acaccgata ggcactctat    1860 caagaaaaac cttatcggtg ctctcctctt cgattctggt gaaactgctg aggctaccag   1920
actcaagaga accgctagaa gaaggtacac cagaagaaag aacaggatct gctacctcca   1980
agagatcttc tctaacgaga tggctaaagt ggatgattca ttcttccaca ggctcgaaga   2040
gtcattcctc gtggaagaag ataagaagca cgagaggcac cctatcttcg gaaacatcgt   2100
tgatgaggtg gcataccacg agaagtaccc tactatctac cacctcagaa agaagctcgt   2160
tgattctact gataaggctg atctcaggct catctacctc gctctcgctc acatgatcaa   2220
gttcagagga cacttcctca tcgagggtga tctcaaccct gataactctg atgtggataa   2280
gttgttcatc cagctcgtgc agacctacaa ccagcttttc gaagagaacc ctatcaacgc   2340
ttcaggtgtg gatgctaagg ctatcctctc tgctaggctc tctaagtcaa gaaggcttga   2400
gaacctcatt gctcagctcc ctggtgagaa gaagaacgga cttttcggaa acttgatcgc   2460
tctctctctc ggactcaccc ctaacttcaa gtctaacttc gatctcgctg aggatgcaaa   2520
gctccagctc tcaaaggata cctacgatga tgatctcgat aacctcctcg ctcagatcgg   2580
agatcagtac gctgatttgt tcctcgctgc taagaacctc tctgatgcta tcctcctcag   2640
tgatatcctc agagtgaaca ccgagatcac caaggctcca ctctcagctt ctatgatcaa   2700
gagatacgat gagcaccacc aggatctcac acttctcaag gctcttgtta gacagcagct   2760
cccagagaag tacaaagaga ttttcttcga tcagtctaag aacggatacg ctggttacat   2820
cgatggtggt gcatctcaag aagagttcta caagttcatc aagcctatcc tcgagaagat   2880
ggatggaacc gaggaactcc tcgtgaagct caatagagag gatcttctca gaaagcagag   2940
```

```
gaccttcgat aacggatcta tccctcatca gatccacctc ggagagttgc acgctatcct    3000
tagaaggcaa gaggatttct acccattcct caaggataac agggaaaaga ttgagaagat    3060
tctcaccttc agaatccctt actacgtggg acctctcgct agaggaaact caagattcgc    3120
ttggatgacc agaaagtctg aggaaaccat cacccctgg aacttcgaag aggtggtgga    3180
taagggtgct agtgctcagt ctttcatcga gaggatgacc aacttcgata agaaccttcc    3240
aaacgagaag gtgctcccta agcactcttt gctctacgag tacttcaccg tgtacaacga    3300
gttgaccaag gttaagtacg tgaccgaggg aatgaggaag cctgcttttt tgtcaggtga    3360
gcaaaagaag gctatcgttg atctcttgtt caagaccaac agaaaggtga ccgtgaagca    3420
gctcaaagag gattacttca agaaaatcga gtgcttcgat tcagttgaga tttctggtgt    3480
tgaggatagg ttcaacgcat ctctcggaac ctaccacgat ctcctcaaga tcattaagga    3540
taaggatttc ttggataacg aggaaaacga ggatatcttg gaggatatcg ttcttaccct    3600
caccctcttt gaagatagag agatgattga agaaaggctc aagacctacg ctcatctctt    3660
cgatgataag gtgatgaagc agttgaagag aagaagatac actggttggg gaaggctctc    3720
aagaaagctc attaacggaa tcagggataa gcagtctgga aagacaatcc ttgatttcct    3780
caagtctgat ggattcgcta acagaaactt catgcagctc atccacgatg attctctcac    3840
ctttaaagag gatatccaga aggctcaggt ttcaggacag ggtgatagtc tccatgagca    3900
tatcgctaac ctcgctggat ctcctgcaat caagaaggga atcctccaga ctgtgaaggt    3960
tgtggatgag ttggtgaagg tgatgggaag gcataagcct gagaacatcg tgatcgaaat    4020
ggctagagag aaccagacca ctcagaaggg acagaagaac tctagggaaa ggatgaagag    4080
gatcgaggaa ggtatcaaag agcttggatc tcagatcctc aaagagcacc ctgttgagaa    4140
cactcagctc cagaatgaga agctctacct ctactacctc cagaacggaa gggatatgta    4200
tgtggatcaa gagttggata tcaacaggct ctctgattac gatgttgatc atatcgtgcc    4260
acagtcattc ttgaaggatg attctatcga taacaaggtg ctcaccaggt ctgataagaa    4320
caggggtaag agtgataacg tgccaagtga agaggttgtg aagaaaatga gaaactattg    4380
gaggcagctc ctcaacgcta agctcatcac tcagagaaag ttcgataact tgactaaggc    4440
tgagagggga ggactctctg aattggataa ggcaggattc atcaagaggc agcttgtgga    4500
aaccaggcag atcactaagc acgttgcaca gatcctcgat tctaggatga caccaagta    4560 cgatgagaac gataagttga tcagggaagt gaaggttatc accctcaagt caaagctcgt    4620
gtctgatttc agaaaggatt tccaattcta caaggtgagg gaaatcaaca actaccacca    4680
cgctcacgat gcttacctta acgctgttgt tggaaccgct ctcatcaaga agtatcctaa    4740
gctcgagtca gagttcgtgt acggtgatta caaggtgtac gatgtgagga gatgatcgc    4800 taagtctgag caagagatcg gaaaggctac cgctaagtat ttcttctact ctaacatcat    4860
gaatttcttc aagaccgaga ttaccctcgc taacggtgag atcagaaaga ggccactcat    4920
cgagacaaac ggtgaaacag gtgagatcgt gtgggataag ggaagggatt cgctaccgt    4980 tagaaaggtg ctctctatgc cacaggtgaa catcgttaag aaaaccgagg tgcagaccgg    5040
tggattctct aaagagtcta tcctccctaa gaggaactct gataagctca ttgctaggaa    5100
gaaggattgg gaccctaaga atacggtgg tttcgattct cctaccgtgg cttactctgt    5160
tctcgttgtg gctaaggttg agaagggaaa gagtaagaag ctcaagtctg ttaaggaact    5220
tctcggaatc actatcatgg aaaggtcatc tttcgagaag aacccaatcg atttcctcga    5280
```

| | |
|---|---:|
| ggctaaggga tacaaagagg ttaagaagga tctcatcatc aagctcccaa agtactcact | 5340 |
| cttcgaactc gagaacggta gaaagaggat gctcgcttct gctggtgagc ttcaaaaggg | 5400 |
| aaacgagctt gctctcccat ctaagtacgt taactttctt tacctcgctt ctcactacga | 5460 |
| gaagttgaag ggatctccag aagataacga gcagaagcaa cttttcgttg agcagcacaa | 5520 |
| gcactacttg gatgagatca tcgagcagat ctctgagttc tctaaagggt tgatcctcgc | 5580 |
| tgatgcaaac ctcgataagg tgttgtctgc ttacaacaag cacagagata agcctatcag | 5640 |
| ggaacaggca gagaacatca tccatctctt caccettacc aacctcggtg ctcctgctgc | 5700 |
| tttcaagtac ttcgatacaa ccatcgatag gaagagatac acctctacca agaagtgct | 5760 |
| cgatgctacc ctcatccatc agtctatcac tggactctac gagactagga tcgatctctc | 5820 |
| acagctcggt ggtgattcaa gggctgatcc taagaagaag aggaaggttt gagcttgtca | 5880 |
| agcagatcgt tcaaacattt ggcaataaag tttcttaaga ttgaatcctg ttgccggtct | 5940 |
| tgcgatgatt atcatataat ttctgttgaa ttacgttaag catgtaataa ttaacatgta | 6000 |
| atgcatgacg ttatttatga gatgggtttt tatgattaga gtcccgcaat tatacattta | 6060 |
| atacgcgata gaaaacaaaa tatagcgcgc aaactaggat aaattatcgc gcgcggtgtc | 6120 |
| atctatgtta ctagatc | 6137 |

```
<210> SEQ ID NO 10
<211> LENGTH: 2311
<212> TYPE: DNA
<213> ORGANISM: Artificial Sequence
<220> FEATURE:
<223> OTHER INFORMATION: Synthesized

<400> SEQUENCE: 10
```

| | |
|---|---:|
| aatgtcgcgg aacaaatttt aaaactaaat cctaaatttt tctaattttg ttgccaatag | 60 |
| tggatatgtg ggccgtatag aaggaatcta ttgaaggccc aaacccatac tgacgagccc | 120 |
| aaaggttcgt tttgcgtttt atgtttcggt tcgatgccaa cgccacattc tgagctaggc | 180 |
| aaaaaacaaa cgtgtctttg aatagactcc tctcgttaac acatgcagcg gctgcatggt | 240 |
| gacgccatta acacgtggcc tacaattgca tgatgtctcc attgacacgt gacttctcgt | 300 |
| ctcctttctt aatatatcta acaaacactc ctacctcttc caaaatatat acacatcttt | 360 |
| ttgatcaatc tctcattcaa aatctcattc tctctagtaa acaagaacaa aaaaatggcg | 420 |
| gatacagcta gaggaaccca tcacgatatc atcggcagag atcagtaccc gatgatgggc | 480 |
| cgagatcgtg accagtacca gatgtccgga cgaggatctg actactccaa gtctaggcag | 540 |
| attgctaaag ctgcaactgc tgtcacagct ggtggttccc tccttgttct ctccagcctt | 600 |
| acccttgttg gaactgtcat agctttgact gttgcaacac ctctgctcgt tatcttcagc | 660 |
| ccaatccttg tcccggctct catcacagtt gcactcctca tcaccggttt tctttcctct | 720 |
| ggagggtttg gcattgccgc tataaccgtt ttctcttgga tttacaagta agcacacatt | 780 |
| tatcatctta cttcataatt ttgtgcaata tgtgcatgca tgtgttgagc cagtagcttt | 840 |
| ggatcaattt ttttggtcga ataacaaatg taacaataag aaattgcaaa ttctagggaa | 900 |
| catttggtta actaaatacg aaatttgacc tagctagctt gaatgtgtct gtgtatatca | 960 |
| tctatatagg taaaatgctt ggtatgatac ctattgattg tgaataggta cgcaacggga | 1020 |
| gagcacccac agggatcaga caagttggac agtgcaagga tgaagttggg aagcaaagct | 1080 |
| caggatctga aagacagagc tcagtactac ggacagcaac atactggtgg ggaacatgac | 1140 |
| cgtgaccgta ctcgtggtgg ccagcacact actatgagcg agctgattaa ggagaacatg | 1200 |

```
cacatgaagc tgtacatgga gggcaccgtg aacaaccacc acttcaagtg cacatccgag      1260
ggcgaaggca agcccctacga gggcacccag accatgagaa tcaaggtggt cgagggcggc      1320
cctctcccct tcgccttcga catcctggct accagcttca tgtacggcag cagaaccttc      1380
atcaaccaca cccagggcat ccccgacttc tttaagcagt ccttccctga gggcttcaca      1440
tgggagagag tcaccacata cgaagatggg ggcgtgctga ccgctaccca ggacaccagc      1500
ctccaggacg gctgcctcat ctacaacgtc aagatcagag gggtgaactt cccatccaac      1560
ggccctgtga tgcagaagaa aacactcggc tgggaggcca acaccgagat gctgtacccc      1620
gctgacggcg gcctggaagg cagaagcgac atggccctga gctcgtggg cggggggccac      1680 ctgatctgca acttcaagac cacatacaga tccaagaaac ccgctaagaa cctcaagatg      1740
cccggcgtct actatgtgga ccacagactg gaaagaatca aggaggccga caaagaaacc      1800
tacgtcgagc agcacgaggt ggctgtggcc agatactgcg acctccctag caaactgggg      1860
cacaagtgag cttaccccac tgatgtcatc gtcatagtcc aataactcca atgtcgggga      1920
gttagtttat gaggaataaa gtgtttagaa tttgatcagg gggagataat aaaagccgag      1980
tttgaatctt tttgttataa gtaatgttta tgtgtgtttc tatatgttgt caaatggtac      2040 catgttttt ttcctctctt tttgtaactt gcaagtgttg tgttgtactt tatttggctt      2100 cttttgtaagt tggtaacggt ggtctatata tggaaaaggt cttgttttgt taaacttatg      2160
ttagttaact ggattcgtct ttaaccacaa aaagttttca ataagctaca aatttagaca      2220
cgcaagccga tgcagtcatt agtacatata tttattgcaa gtgattacat ggcaacccaa      2280
acttcaaaaa cagtaggttg ctccatttag t                                    2311
```

<210> SEQ ID NO 11
<211> LENGTH: 5247
<212> TYPE: DNA
<213> ORGANISM: Artificial Sequence
<220> FEATURE:
<223> OTHER INFORMATION: Synthesized

<400> SEQUENCE: 11

```
gtcaacatgg tggagcacga cactctggtc tactccaaaa atgtcaaaga tacagtctca       60
gaagatcaaa gggctattga gacttttcaa caaaggataa tttcgggaaa cctcctcgga      120
ttccattgcc cagctatctg tcacttcatc gaaaggacag tagaaaagga aggtggctcc      180
tacaaatgcc atcattgcga taaaggaaag gctatcattc aagatctctc tgccgacagt      240
ggtcccaaag atggacccc acccacgagg agcatcgtgg aaaagaagaa ggttccaacc      300
acgtctacaa agcaagtgga ttgatgtgat aacatggtgg agcacgacac tctggtctac      360
tccaaaaatg tcaaagatac agtctcagaa gatcaaaggg ctattgagac ttttcaacaa      420
aggataattt cgggaaacct cctcggattc cattgcccag ctatctgtca cttcatcgaa      480
aggacagtag aaaaggaagg tggctcctac aaatgccatc attgcgataa aggaaaggct      540
atcattcaag atctctctgc cgacagtggt cccaaagatg acccccacc cacgaggagc      600 atcgtggaaa agaagaggt tccaaccacg tctacaaagc aagtggattg atgtgacatc      660
tccactgacg taagggatga cgcacaatcc cactatcctt cgcaagaccc ttcctctata      720
taaggaagtt catttcattt ggagaggaca cgctcgagta taagagctca ttttttacaac      780 aattaccaac aacaacaaac aacaaacaac attacaatta catttacaat tatcgataca      840
atggacaaga agtactccat tgggctcgat atcggcacaa acagcgtcgg ctgggccgtc      900
```

-continued

```
attacggacg agtacaaggt gccgagcaaa aaattcaaag ttctgggcaa taccgatcgc    960
cacagcataa agaagaacct cattggcgcc ctcctgttcg actccgggga gacggccgaa   1020
gccacgcggc tcaaaagaac agcacggcgc agatataccc gcagaaagaa tcggatctgc   1080
tacctgcagg agatctttag taatgagatg gctaaggtgg atgactcttt cttccatagg   1140
ctggaggagt cctttttggt ggaggaggat aaaaagcacg agcgccaccc aatctttggc   1200
aatatcgtgg acgaggtggc gtaccatgaa aagtacccaa ccatatatca tctgaggaag   1260
aagcttgtag acagtactga taaggctgac ttgcggttga tctatctcgc gctggcgcat   1320
atgatcaaat ttcggggaca cttcctcatc gagggggacc tgaacccaga caacagcgat   1380
gtcgacaaac tctttatcca actggttcag acttacaatc agcttttcga agagaacccg   1440
atcaacgcat ccggagttga cgccaaagca atcctgagcg ctaggctgtc caaatcccgg   1500
cggctcgaaa acctcatcgc acagctccct ggggagaaga agaacggcct gtttggtaat   1560
cttatcgccc tgtcactcgg gctgacccccc aactttaaat ctaacttcga cctggccgaa   1620
gatgccaagc ttcaactgag caaagacacc tacgatgatg atctcgacaa tctgctggcc   1680
cagatcggcg accagtacgc agaccttttt ttggcggcaa agaacctgtc agacgccatt   1740
ctgctgagtg atattctgcg agtgaacacg gagatcacca agctccgct gagcgctagt   1800 atgatcaagc gctatgatga gcaccaccaa gacttgactt tgctgaaggc ccttgtcaga   1860
cagcaactgc ctgagaagta caggaaaatt ttcttcgatc agtctaaaaa tggctacgcc   1920
ggatacattg acggcggagc aagccaggag gaattttaca aatttattaa gcccatcttg   1980
gaaaaaatgg acggcaccga ggagctgctg gtaaagctta acagagaaga tctgttgcgc   2040
aaacagcgca ctttcgacaa tggaagcatc ccccaccaga ttcacctggg cgaactgcac   2100
gctatcctca ggcggcaaga ggatttctac ccctttttga aagataacag ggaaaagatt   2160
gagaaaatcc tcacatttcg gatacccctac tatgtaggcc ccctcgcccg gggaaattcc   2220
agattcgcgt ggatgactcg caaatcagaa gagactatca ctcccctggaa cttcgaggaa   2280 gtcgtggata agggggcctc tgcccagtcc ttcatcgaaa ggatgactaa ctttgataaa   2340
aatctgccta cgaaaaggt gcttcctaaa cactctctgc tgtacgagta cttcacagtt   2400
tataacgagc tcaccaaggt caaatacgtc acagaaggga tgagaaagcc agcattcctg   2460
tctggagagc agaagaaagc tatcgtggac ctcctcttca agacgaaccg gaaagttacc   2520
gtgaaacagc tcaaagaaga ttatttcaaa aagattgaat gtttcgactc tgttgaaatc   2580
agcggagtgg aggatcgctt caacgcatcc ctgggaacgt atcacgatct cctgaaaatc   2640
attaaagaca aggacttcct ggacaatgag gagaacgagg acattcttga ggacattgtc   2700 ctcacccta cgttgttttga agataggggag atgattgaag aacgcttgaa aacttacgct   2760
catctcttcg acgacaaagt catgaaacag ctcaagaggc gccgatatac aggatggggg   2820
cggctgtcaa gaaaactgat caatgggatc cgagacaagc agagtggaaa gacaatcctg   2880 gatttttctta agtccgatgg atttgccaac cggaacttca tgcagttgat ccatgatgac   2940
tctctcacct ttaaggagga catccagaaa gcacaagttt ctggccaggg ggacagtctc   3000
cacgagcaca tcgctaatct tgcaggtagc ccagctatca aaaagggaat actgcagacc   3060
gttaaggtcg tggatgaact cgtcaaagta atgggaaggc ataagcccga aatatcgtt   3120 atcgagatgg cccgagagaa ccaaactacc cagaagggac agaagaacag tagggaaagg   3180
atgaagagga ttgaagaggg tataaaagaa ctggggtccc aaatccttaa ggaacaccca   3240
gttgaaaaca cccagcttca gaatgagaag ctctacctgt actacctgca gaacggcagg   3300
```

```
gacatgtacg tggatcagga actggacatc aatcggctct ccgactacga cgtggatcat    3360
atcgtgcccc agtcttttct caaagatgat tctattgata taaagtgtt gacaagatcc    3420 gataaaaata gagggaagag tgataacgtc ccctcagaag aagttgtcaa gaaaatgaaa    3480
aattattggc ggcagctgct gaacgccaaa ctgatcacac aacggaagtt cgataatctg    3540
actaaggctg aacgaggtgg cctgtctgag ttggataaag ccggcttcat caaaaggcag    3600
cttgttgaga cacgccagat caccaagcac gtggcccaaa ttctcgattc acgcatgaac    3660
accaagtacg atgaaaatga caaactgatt cgagaggtga agttattac tctgaagtct    3720 aagctggttt cagatttcag aaaggacttt cagttttata aggtgagaga gatcaacaat    3780
taccaccatg cgcatgatgc ctacctgaat gcagtggtag gcactgcact tatcaaaaaa    3840
tatcccaagc ttgaatctga atttgtttac ggagactata agtgtacga tgttaggaaa    3900 atgatcgcaa agtctgagca ggaaataggc aaggccaccg ctaagtactt cttttacagc    3960
aatattatga atttttcaa gaccgagatt acactggcca atggagagat tcggaagcga    4020
ccacttatcg aaacaaacgg agaaacagga gaaatcgtgt gggacaaggg tagggatttc    4080
gcgacagtcc ggaaggtcct gtccatgccg caggtgaaca tcgttaaaaa gaccgaagta    4140
cagaccggag gcttctccaa ggaaagtatc ctcccgaaaa ggaacagcga caagctgatc    4200
gcacgcaaaa aagattggga ccccaagaaa tacggcggat tcgattctcc tacagtcgct    4260
tacagtgtac tggttgtggc caaagtggag aaagggaagt ctaaaaaact caaaagcgtc    4320
aaggaactgc tgggcatcac aatcatggag cgatcaagct tcgaaaaaaa ccccatcgac    4380
tttctcgagg cgaaaggata taagaggtc aaaaaagacc tcatcattaa gcttcccaag    4440
tactctctct ttgagcttga aaacggccgg aaacgaatgc tcgctagtgc gggcgagctg    4500
cagaaaggta acgagctggc actgcctct aaatacgtta attcttgta tctggccagc    4560 cactatgaaa agctcaaagg atctcccgaa gataatgagc agaagcagct gttcgtggaa    4620
caacacaaac actaccttga tgagatcatc gagcaaataa gcgaattctc caaaagagtg    4680
atcctcgccg acgctaacct cgataaggtg ctttctgctt acaataagca cagggataag    4740
cccatcaggg agcaggcaga aaacattatc cacttgttta ctctgaccaa cttgggcgcg    4800
cctgcagcct tcaagtactt cgacaccacc atagacagaa agcggtacac ctctacaaag    4860
gaggtcctgg acgccacact gattcatcag tcaattacgg ggctctatga aacaagaatc    4920
gacctctctc agctcggtgg agacagcagg gctgacccca agaagaagag gaaggtgtga    4980
gcttgtcaag cagatcgttc aaacatttgg caataaagtt tcttaagatt gaatcctgtt    5040
gccggtcttg cgatgattat catataattt ctgttgaatt acgttaagca tgtaataatt    5100
aacatgtaat gcatgacgtt atttatgaga tgggttttta tgattagagt cccgcaatta    5160
tacatttaat acgcgataga aaacaaaata tagcgcgcaa actaggataa attatcgcgc    5220
gcggtgtcat ctatgttact agatcga                                      5247
```

<210> SEQ ID NO 12
<211> LENGTH: 1867
<212> TYPE: DNA
<213> ORGANISM: Artificial Sequence
<220> FEATURE:
<223> OTHER INFORMATION: Synthesized

<400> SEQUENCE: 12

```
cggagaatta agggagtcac gttatgaccc ccgccgatga cgcgggacaa gccgttttac      60
```

```
gtttggaact gacagaaccg caacgttgaa ggagccactg agccgcgggt ttctggagtt    120
taatgagcta agcacatacg tcagaaacca ttattgcgcg ttcaaaagtc gcctaaggtc    180
actatcagct agcaaatatt tcttgtcaaa aatgctccac tgacgttcca taaattcccc    240
tcggtatcca attagagtct catattcact ctcctatttt tacaacaatt accaacaaca    300
acaaacaaca aacaacatta caattacatt tacaattacc atggttgaac aagatggatt    360
gcacgcaggt tctccggccg cttgggtgga gaggctattc ggctatgact gggcacaaca    420
gacaatcggc tgctctgatg ccgccgtgtt ccggctgtca gcgcaggggc gcccggttct    480
ttttgtcaag accgacctgt ccggtgccct gaatgaactg caggacgagg cagcgcggct    540
atcgtggctg gccacgacgg gcgttccttg cgcagctgtg ctcgacgttg tcactgaagc    600
gggaagggac tggctgctat tgggcgaagt gccggggcag gatctcctgt catctcacct    660
tgctcctgcc gagaaagtat ccatcatggc tgatgcaatg cggcggctgc atacgcttga    720
tccggctacc tgcccattcg accaccaagc gaaacatcgc atcgagcgag cacgtactcg    780
gatggaagcc ggtcttgtcg atcaggatga tctggacgaa gagcatcagg ggctcgcgcc    840
agccgaactg ttcgccaggc tcaaggcgcg catgcccgac ggcgaggatc tcgtcgtgac    900
tcatggcgat gcctgcttgc cgaatatcat ggtggaaaat ggccgctttt ctggattcat    960
cgactgtggc cggctgggtg tggcggaccg ctatcaggac atagcgttgg ctacccgtga    1020
tattgctgaa gagcttggcg gcgaatgggc tgaccgcttc ctcgtgcttt acggtatcgc    1080
cgctcccgat tcgcagcgca tcgccttcta tcgccttctt gacgagttct tctgagcggg    1140
actctggggt tcgctagagt cctgctttaa tgagatatgc gagacgccta tgatcgcatg    1200
atatttgctt tcaattctgt tgtgcacgtt gtaaaaaacc tgagcatgtg tagctcagat    1260
ccttaccgcc ggtttcggtt cattctaatg aatatatcac ccgttactat cgtatttta    1320 tgaataatat tctccgttca atttactgat tgtaccctac tacttatatg tacaatatta    1380
aaatgaaaac aatatattgt gctgaatagg tttatagcga catctatgat agagcgccac    1440
aataacaaac aattgcgttt tattattaca aatccaattt taaaaaaagc ggcagaaccg    1500
gtcaaaccta aaagactgat tacataaatc ttattcaaat ttcaaaagtg ccccaggggc    1560
tagtatctac gacacaccga gcggcgaact aataacgctc actgaaggga actccggttc    1620
cccgccggcg cgcatgggtg agattccttg aagttgagta ttggccgtcc gctctaccga    1680
aagttacggg caccattcaa cccggtccag cacggcggcc gggtaaccga cttgctgccc    1740
cgagaattat gcagcatttt tttggtgtat gtgggcccca aatgaagtgc aggtcaaacc    1800
ttgacagtga cgacaaatcg ttgggcgggt ccagggcgaa ttttgcgaca acatgtcgag    1860
gctcagc                                                              1867
```

<210> SEQ ID NO 13  
<211> LENGTH: 16  
<212> TYPE: DNA  
<213> ORGANISM: Artificial Sequence  
<220> FEATURE:  
<223> OTHER INFORMATION: Synthesized

<400> SEQUENCE: 13

```
gtttacacgg cgactc                                                     16
```

<210> SEQ ID NO 14  
<211> LENGTH: 401  
<212> TYPE: DNA  
<213> ORGANISM: Artificial Sequence

```
<220> FEATURE:
<223> OTHER INFORMATION: Synthesized

<400> SEQUENCE: 14
cgtcggaatc agagtttaca cggcgactcc gccgcaaaaa ccatcaccat caccaccttc     60
tcgttcacca aaacccgtct taatctcttc attgccttcc ctcccgtcag gagccgccgc    120
tggaggagga agaggtcgaa aacgtcgcat ggtggcgcaa ggagttcaaa aaacggtttc    180
gaagacatca atgctcgtca acttccttcc gacaggaaca ctcttgatgt tcgaaatggt    240
tcttccatca atataccgtg acggagactg taacggaatc aacacactca tgattcatct    300
cctcttgctt ctttgcgcaa tgtcttgttt cttcttccat tttaccgaca gtttcaaagc    360
atccgatggg aagatctact acggtttcgt gacgccacgt g                        401

<210> SEQ ID NO 15
<211> LENGTH: 20
<212> TYPE: DNA
<213> ORGANISM: Artificial Sequence
<220> FEATURE:
<223> OTHER INFORMATION: Synthesized

<400> SEQUENCE: 15
gagaaaacag aggaaagcgt                                                 20

<210> SEQ ID NO 16
<211> LENGTH: 20
<212> TYPE: DNA
<213> ORGANISM: Artificial Sequence
<220> FEATURE:
<223> OTHER INFORMATION: Synthesized

<400> SEQUENCE: 16
aagaggtcga aaacgtcgca                                                 20

<210> SEQ ID NO 17
<211> LENGTH: 20
<212> TYPE: DNA
<213> ORGANISM: Artificial Sequence
<220> FEATURE:
<223> OTHER INFORMATION: Synthesized

<400> SEQUENCE: 17
tcaagagtgt tcctgtcgga                                                 20

<210> SEQ ID NO 18
<211> LENGTH: 20
<212> TYPE: DNA
<213> ORGANISM: Artificial Sequence
<220> FEATURE:
<223> OTHER INFORMATION: Synthesized

<400> SEQUENCE: 18
atgaacaccg cgagtccacg                                                 20

<210> SEQ ID NO 19
<211> LENGTH: 23
<212> TYPE: DNA
<213> ORGANISM: Artificial Sequence
<220> FEATURE:
<223> OTHER INFORMATION: Synthesized

<400> SEQUENCE: 19
tgcgaaatga gattggtttt ggg                                             23
```

<210> SEQ ID NO 20
<211> LENGTH: 20
<212> TYPE: DNA
<213> ORGANISM: Artificial Sequence
<220> FEATURE:
<223> OTHER INFORMATION: Synthesized

<400> SEQUENCE: 20
aaacaccctg tgactctccg                                               20

<210> SEQ ID NO 21
<211> LENGTH: 20
<212> TYPE: DNA
<213> ORGANISM: Artificial Sequence
<220> FEATURE:
<223> OTHER INFORMATION: Synthesized

<400> SEQUENCE: 21
ataaccgtca ataaccgccg                                               20

<210> SEQ ID NO 22
<211> LENGTH: 20
<212> TYPE: DNA
<213> ORGANISM: Artificial Sequence
<220> FEATURE:
<223> OTHER INFORMATION: Synthesized

<400> SEQUENCE: 22
ccagtcatgc aaccaacacc                                               20

<210> SEQ ID NO 23
<211> LENGTH: 15
<212> TYPE: DNA
<213> ORGANISM: Artificial Sequence
<220> FEATURE:
<223> OTHER INFORMATION: Synthesized

<400> SEQUENCE: 23
ggggcgtcgg aatca                                                    15

<210> SEQ ID NO 24
<211> LENGTH: 10
<212> TYPE: DNA
<213> ORGANISM: Artificial Sequence
<220> FEATURE:
<223> OTHER INFORMATION: Synthesized

<400> SEQUENCE: 24
gactccacgt                                                          10

<210> SEQ ID NO 25
<211> LENGTH: 17
<212> TYPE: DNA
<213> ORGANISM: Artificial Sequence
<220> FEATURE:
<223> OTHER INFORMATION: Synthesized

<400> SEQUENCE: 25
gaaagacgtc ggaatca                                                  17

<210> SEQ ID NO 26
<211> LENGTH: 10
<212> TYPE: DNA
<213> ORGANISM: Artificial Sequence
<220> FEATURE:
<223> OTHER INFORMATION: Synthesized

```
<400> SEQUENCE: 26
gactccacgt                                                          10

<210> SEQ ID NO 27
<211> LENGTH: 15
<212> TYPE: DNA
<213> ORGANISM: Artificial Sequence
<220> FEATURE:
<223> OTHER INFORMATION: Synthesized

<400> SEQUENCE: 27
gggtcgtcgg aatca                                                    15

<210> SEQ ID NO 28
<211> LENGTH: 10
<212> TYPE: DNA
<213> ORGANISM: Artificial Sequence
<220> FEATURE:
<223> OTHER INFORMATION: Synthesized

<400> SEQUENCE: 28
gactccacgt                                                          10

<210> SEQ ID NO 29
<211> LENGTH: 11
<212> TYPE: DNA
<213> ORGANISM: Artificial Sequence
<220> FEATURE:
<223> OTHER INFORMATION: Synthesized

<400> SEQUENCE: 29
cgtcggaatc a                                                        11

<210> SEQ ID NO 30
<211> LENGTH: 10
<212> TYPE: DNA
<213> ORGANISM: Artificial Sequence
<220> FEATURE:
<223> OTHER INFORMATION: Synthesized

<400> SEQUENCE: 30
gactccacgt                                                          10

<210> SEQ ID NO 31
<211> LENGTH: 17
<212> TYPE: DNA
<213> ORGANISM: Artificial Sequence
<220> FEATURE:
<223> OTHER INFORMATION: Synthesized

<400> SEQUENCE: 31
gaaagacgtc ggaatca                                                  17

<210> SEQ ID NO 32
<211> LENGTH: 10
<212> TYPE: DNA
<213> ORGANISM: Artificial Sequence
<220> FEATURE:
<223> OTHER INFORMATION: Synthesized

<400> SEQUENCE: 32
gactccacgt                                                          10

<210> SEQ ID NO 33
```

```
<211> LENGTH: 17
<212> TYPE: DNA
<213> ORGANISM: Artificial Sequence
<220> FEATURE:
<223> OTHER INFORMATION: Synthesized

<400> SEQUENCE: 33
gaaaggcgtc ggaatca                                                    17

<210> SEQ ID NO 34
<211> LENGTH: 10
<212> TYPE: DNA
<213> ORGANISM: Artificial Sequence
<220> FEATURE:
<223> OTHER INFORMATION: Synthesized

<400> SEQUENCE: 34
gactccacgt                                                            10

<210> SEQ ID NO 35
<211> LENGTH: 17
<212> TYPE: DNA
<213> ORGANISM: Artificial Sequence
<220> FEATURE:
<223> OTHER INFORMATION: Synthesized

<400> SEQUENCE: 35
gaaagtcgtc ggaatca                                                    17

<210> SEQ ID NO 36
<211> LENGTH: 10
<212> TYPE: DNA
<213> ORGANISM: Artificial Sequence
<220> FEATURE:
<223> OTHER INFORMATION: Synthesized

<400> SEQUENCE: 36
gactccacgt                                                            10

<210> SEQ ID NO 37
<211> LENGTH: 10
<212> TYPE: DNA
<213> ORGANISM: Artificial Sequence
<220> FEATURE:
<223> OTHER INFORMATION: Synthesized

<400> SEQUENCE: 37
gactccacgt                                                            10

<210> SEQ ID NO 38
<211> LENGTH: 15
<212> TYPE: DNA
<213> ORGANISM: Artificial Sequence
<220> FEATURE:
<223> OTHER INFORMATION: Synthesized

<400> SEQUENCE: 38
ggggcgtcgg aatca                                                      15

<210> SEQ ID NO 39
<211> LENGTH: 10
<212> TYPE: DNA
<213> ORGANISM: Artificial Sequence
<220> FEATURE:
<223> OTHER INFORMATION: Synthesized

<400> SEQUENCE: 39
```

-continued

```
gactccacgt                                                          10

<210> SEQ ID NO 40
<211> LENGTH: 17
<212> TYPE: DNA
<213> ORGANISM: Artificial Sequence
<220> FEATURE:
<223> OTHER INFORMATION: Synthesized

<400> SEQUENCE: 40
gaaaggcgtc ggaatca                                                  17

<210> SEQ ID NO 41
<211> LENGTH: 10
<212> TYPE: DNA
<213> ORGANISM: Artificial Sequence
<220> FEATURE:
<223> OTHER INFORMATION: Synthesized

<400> SEQUENCE: 41
gactccacgt                                                          10

<210> SEQ ID NO 42
<211> LENGTH: 15
<212> TYPE: DNA
<213> ORGANISM: Artificial Sequence
<220> FEATURE:
<223> OTHER INFORMATION: Synthesized

<400> SEQUENCE: 42
ggggcgtcgg aatca                                                    15

<210> SEQ ID NO 43
<211> LENGTH: 10
<212> TYPE: DNA
<213> ORGANISM: Artificial Sequence
<220> FEATURE:
<223> OTHER INFORMATION: Synthesized

<400> SEQUENCE: 43
gactccacgt                                                          10

<210> SEQ ID NO 44
<211> LENGTH: 17
<212> TYPE: DNA
<213> ORGANISM: Artificial Sequence
<220> FEATURE:
<223> OTHER INFORMATION: Synthesized

<400> SEQUENCE: 44
gaaaggcgtc ggaatca                                                  17

<210> SEQ ID NO 45
<211> LENGTH: 10
<212> TYPE: DNA
<213> ORGANISM: Artificial Sequence
<220> FEATURE:
<223> OTHER INFORMATION: Synthesized

<400> SEQUENCE: 45
gactccacgt                                                          10

<210> SEQ ID NO 46
<211> LENGTH: 10
<212> TYPE: DNA
```

```
<213> ORGANISM: Artificial Sequence
<220> FEATURE:
<223> OTHER INFORMATION: Synthesized

<400> SEQUENCE: 46
gtcggaatca                                                              10

<210> SEQ ID NO 47
<211> LENGTH: 10
<212> TYPE: DNA
<213> ORGANISM: Artificial Sequence
<220> FEATURE:
<223> OTHER INFORMATION: Synthesized

<400> SEQUENCE: 47
gactccacgt                                                              10

<210> SEQ ID NO 48
<211> LENGTH: 17
<212> TYPE: DNA
<213> ORGANISM: Artificial Sequence
<220> FEATURE:
<223> OTHER INFORMATION: Synthesized

<400> SEQUENCE: 48
gaaaggcgtc ggaatca                                                      17

<210> SEQ ID NO 49
<211> LENGTH: 10
<212> TYPE: DNA
<213> ORGANISM: Artificial Sequence
<220> FEATURE:
<223> OTHER INFORMATION: Synthesized

<400> SEQUENCE: 49
gactccacgt                                                              10

<210> SEQ ID NO 50
<211> LENGTH: 15
<212> TYPE: DNA
<213> ORGANISM: Artificial Sequence
<220> FEATURE:
<223> OTHER INFORMATION: Synthesized

<400> SEQUENCE: 50
ggggcgtcgg aatca                                                        15

<210> SEQ ID NO 51
<211> LENGTH: 10
<212> TYPE: DNA
<213> ORGANISM: Artificial Sequence
<220> FEATURE:
<223> OTHER INFORMATION: Synthesized

<400> SEQUENCE: 51
gactccacgt                                                              10

<210> SEQ ID NO 52
<211> LENGTH: 11
<212> TYPE: DNA
<213> ORGANISM: Artificial Sequence
<220> FEATURE:
<223> OTHER INFORMATION: Synthesized

<400> SEQUENCE: 52
cgtcggaatc a                                                            11
```

```
<210> SEQ ID NO 53
<211> LENGTH: 10
<212> TYPE: DNA
<213> ORGANISM: Artificial Sequence
<220> FEATURE:
<223> OTHER INFORMATION: Synthesized

<400> SEQUENCE: 53
gactccacgt                                                          10

<210> SEQ ID NO 54
<211> LENGTH: 11
<212> TYPE: DNA
<213> ORGANISM: Artificial Sequence
<220> FEATURE:
<223> OTHER INFORMATION: Synthesized

<400> SEQUENCE: 54
cgtcggaatc a                                                        11

<210> SEQ ID NO 55
<211> LENGTH: 10
<212> TYPE: DNA
<213> ORGANISM: Artificial Sequence
<220> FEATURE:
<223> OTHER INFORMATION: Synthesized

<400> SEQUENCE: 55
gactccacgt                                                          10

<210> SEQ ID NO 56
<211> LENGTH: 15
<212> TYPE: DNA
<213> ORGANISM: Artificial Sequence
<220> FEATURE:
<223> OTHER INFORMATION: Synthesized

<400> SEQUENCE: 56
gggtcgtcgg aatca                                                    15

<210> SEQ ID NO 57
<211> LENGTH: 15
<212> TYPE: DNA
<213> ORGANISM: Artificial Sequence
<220> FEATURE:
<223> OTHER INFORMATION: Synthesized

<400> SEQUENCE: 57
gggtcgtcgg aatca                                                    15

<210> SEQ ID NO 58
<211> LENGTH: 11
<212> TYPE: DNA
<213> ORGANISM: Artificial Sequence
<220> FEATURE:
<223> OTHER INFORMATION: Synthesized

<400> SEQUENCE: 58
cgtcggaatc a                                                        11

<210> SEQ ID NO 59
<211> LENGTH: 10
<212> TYPE: DNA
<213> ORGANISM: Artificial Sequence
<220> FEATURE:
```

<223> OTHER INFORMATION: Synthesized

<400> SEQUENCE: 59
gactccacgt                                                              10

<210> SEQ ID NO 60
<211> LENGTH: 11
<212> TYPE: DNA
<213> ORGANISM: Artificial Sequence
<220> FEATURE:
<223> OTHER INFORMATION: Synthesized

<400> SEQUENCE: 60
cgtcggaatc a                                                            11

<210> SEQ ID NO 61
<211> LENGTH: 11
<212> TYPE: DNA
<213> ORGANISM: Artificial Sequence
<220> FEATURE:
<223> OTHER INFORMATION: Synthesized

<400> SEQUENCE: 61
cgtcggaatc a                                                            11

<210> SEQ ID NO 62
<211> LENGTH: 11
<212> TYPE: DNA
<213> ORGANISM: Artificial Sequence
<220> FEATURE:
<223> OTHER INFORMATION: Synthesized

<400> SEQUENCE: 62
cgtcggaatc a                                                            11

<210> SEQ ID NO 63
<211> LENGTH: 17
<212> TYPE: DNA
<213> ORGANISM: Artificial Sequence
<220> FEATURE:
<223> OTHER INFORMATION: Synthesized

<400> SEQUENCE: 63
gaaaggcgtc ggaatca                                                      17

<210> SEQ ID NO 64
<211> LENGTH: 10
<212> TYPE: DNA
<213> ORGANISM: Artificial Sequence
<220> FEATURE:
<223> OTHER INFORMATION: Synthesized

<400> SEQUENCE: 64
gactccacgt                                                              10

<210> SEQ ID NO 65
<211> LENGTH: 17
<212> TYPE: DNA
<213> ORGANISM: Artificial Sequence
<220> FEATURE:
<223> OTHER INFORMATION: Synthesized

<400> SEQUENCE: 65
gaaagacgtc ggaatca                                                      17

```
<210> SEQ ID NO 66
<211> LENGTH: 10
<212> TYPE: DNA
<213> ORGANISM: Artificial Sequence
<220> FEATURE:
<223> OTHER INFORMATION: Synthesized

<400> SEQUENCE: 66
gactccacgt                                                              10

<210> SEQ ID NO 67
<211> LENGTH: 15
<212> TYPE: DNA
<213> ORGANISM: Artificial Sequence
<220> FEATURE:
<223> OTHER INFORMATION: Synthesized

<400> SEQUENCE: 67
gggtcgtcgg aatca                                                        15

<210> SEQ ID NO 68
<211> LENGTH: 15
<212> TYPE: DNA
<213> ORGANISM: Artificial Sequence
<220> FEATURE:
<223> OTHER INFORMATION: Synthesized

<400> SEQUENCE: 68
gggtcgtcgg aatca                                                        15

<210> SEQ ID NO 69
<211> LENGTH: 17
<212> TYPE: DNA
<213> ORGANISM: Artificial Sequence
<220> FEATURE:
<223> OTHER INFORMATION: Synthesized

<400> SEQUENCE: 69
gaaagacgtc ggaatca                                                      17

<210> SEQ ID NO 70
<211> LENGTH: 10
<212> TYPE: DNA
<213> ORGANISM: Artificial Sequence
<220> FEATURE:
<223> OTHER INFORMATION: Synthesized

<400> SEQUENCE: 70
gactccacgt                                                              10

<210> SEQ ID NO 71
<211> LENGTH: 15
<212> TYPE: DNA
<213> ORGANISM: Artificial Sequence
<220> FEATURE:
<223> OTHER INFORMATION: Synthesized

<400> SEQUENCE: 71
ggggcgtcgg aatca                                                        15

<210> SEQ ID NO 72
<211> LENGTH: 10
<212> TYPE: DNA
<213> ORGANISM: Artificial Sequence
<220> FEATURE:
<223> OTHER INFORMATION: Synthesized
```

```
<400> SEQUENCE: 72
gactccacgt                                                        10

<210> SEQ ID NO 73
<211> LENGTH: 17
<212> TYPE: DNA
<213> ORGANISM: Artificial Sequence
<220> FEATURE:
<223> OTHER INFORMATION: Synthesized

<400> SEQUENCE: 73
gaaagtcgtc ggaatca                                                17

<210> SEQ ID NO 74
<211> LENGTH: 10
<212> TYPE: DNA
<213> ORGANISM: Artificial Sequence
<220> FEATURE:
<223> OTHER INFORMATION: Synthesized

<400> SEQUENCE: 74
gactccacgt                                                        10

<210> SEQ ID NO 75
<211> LENGTH: 11
<212> TYPE: DNA
<213> ORGANISM: Artificial Sequence
<220> FEATURE:
<223> OTHER INFORMATION: Synthesized

<400> SEQUENCE: 75
ccacgtggac t                                                      11

<210> SEQ ID NO 76
<211> LENGTH: 17
<212> TYPE: DNA
<213> ORGANISM: Artificial Sequence
<220> FEATURE:
<223> OTHER INFORMATION: Synthesized

<400> SEQUENCE: 76
gaaaggcgtc ggaatca                                                17

<210> SEQ ID NO 77
<211> LENGTH: 10
<212> TYPE: DNA
<213> ORGANISM: Artificial Sequence
<220> FEATURE:
<223> OTHER INFORMATION: Synthesized

<400> SEQUENCE: 77
gactccacgt                                                        10

<210> SEQ ID NO 78
<211> LENGTH: 13
<212> TYPE: DNA
<213> ORGANISM: Artificial Sequence
<220> FEATURE:
<223> OTHER INFORMATION: Synthesized

<400> SEQUENCE: 78
ggaaagacgt cgg                                                    13

<210> SEQ ID NO 79
<211> LENGTH: 13
```

```
<212> TYPE: DNA
<213> ORGANISM: Artificial Sequence
<220> FEATURE:
<223> OTHER INFORMATION: Synthesized

<400> SEQUENCE: 79
ggaaagacgt cgg                                                          13

<210> SEQ ID NO 80
<211> LENGTH: 13
<212> TYPE: DNA
<213> ORGANISM: Artificial Sequence
<220> FEATURE:
<223> OTHER INFORMATION: Synthesized

<400> SEQUENCE: 80
ggaaagacgt cgg                                                          13

<210> SEQ ID NO 81
<211> LENGTH: 13
<212> TYPE: DNA
<213> ORGANISM: Artificial Sequence
<220> FEATURE:
<223> OTHER INFORMATION: Synthesized

<400> SEQUENCE: 81
ggaaaggcgt cgg                                                          13

<210> SEQ ID NO 82
<211> LENGTH: 13
<212> TYPE: DNA
<213> ORGANISM: Artificial Sequence
<220> FEATURE:
<223> OTHER INFORMATION: Synthesized

<400> SEQUENCE: 82
ggaaaggcgt cgg                                                          13

<210> SEQ ID NO 83
<211> LENGTH: 13
<212> TYPE: DNA
<213> ORGANISM: Artificial Sequence
<220> FEATURE:
<223> OTHER INFORMATION: Synthesized

<400> SEQUENCE: 83
ggaaagacgt cgg                                                          13

<210> SEQ ID NO 84
<211> LENGTH: 13
<212> TYPE: DNA
<213> ORGANISM: Artificial Sequence
<220> FEATURE:
<223> OTHER INFORMATION: Synthesized

<400> SEQUENCE: 84
ggaaaggcgt cgg                                                          13

<210> SEQ ID NO 85
<211> LENGTH: 11
<212> TYPE: DNA
<213> ORGANISM: Artificial Sequence
<220> FEATURE:
<223> OTHER INFORMATION: Synthesized

<400> SEQUENCE: 85
```

-continued tcgcggtgtt c                                                              11

<210> SEQ ID NO 86
<211> LENGTH: 13
<212> TYPE: DNA
<213> ORGANISM: Artificial Sequence
<220> FEATURE:
<223> OTHER INFORMATION: Synthesized

<400> SEQUENCE: 86
ggaaagacgt cgg                                                            13

<210> SEQ ID NO 87
<211> LENGTH: 13
<212> TYPE: DNA
<213> ORGANISM: Artificial Sequence
<220> FEATURE:
<223> OTHER INFORMATION: Synthesized

<400> SEQUENCE: 87
ggaaagacgt cgg                                                            13

<210> SEQ ID NO 88
<211> LENGTH: 13
<212> TYPE: DNA
<213> ORGANISM: Artificial Sequence
<220> FEATURE:
<223> OTHER INFORMATION: Synthesized

<400> SEQUENCE: 88
ggaaagacgt cgg                                                            13

<210> SEQ ID NO 89
<211> LENGTH: 13
<212> TYPE: DNA
<213> ORGANISM: Artificial Sequence
<220> FEATURE:
<223> OTHER INFORMATION: Synthesized

<400> SEQUENCE: 89
ggaaagacgt cgg                                                            13

<210> SEQ ID NO 90
<211> LENGTH: 13
<212> TYPE: DNA
<213> ORGANISM: Artificial Sequence
<220> FEATURE:
<223> OTHER INFORMATION: Synthesized

<400> SEQUENCE: 90
ggaaagacgt cgg                                                            13

<210> SEQ ID NO 91
<211> LENGTH: 12
<212> TYPE: DNA
<213> ORGANISM: Artificial Sequence
<220> FEATURE:
<223> OTHER INFORMATION: Synthesized

<400> SEQUENCE: 91
ggaaagcgtc gg                                                             12

<210> SEQ ID NO 92
<211> LENGTH: 13
<212> TYPE: DNA
<213> ORGANISM: Artificial Sequence

```
<220> FEATURE:
<223> OTHER INFORMATION: Synthesized

<400> SEQUENCE: 92
ggaaagtcgt cgg                                                              13

<210> SEQ ID NO 93
<211> LENGTH: 14
<212> TYPE: DNA
<213> ORGANISM: Artificial Sequence
<220> FEATURE:
<223> OTHER INFORMATION: Synthesized

<400> SEQUENCE: 93
gacgccacgt ggga                                                             14

<210> SEQ ID NO 94
<211> LENGTH: 13
<212> TYPE: DNA
<213> ORGANISM: Artificial Sequence
<220> FEATURE:
<223> OTHER INFORMATION: Synthesized

<400> SEQUENCE: 94
ggaaagtcgt cgg                                                              13

<210> SEQ ID NO 95
<211> LENGTH: 14
<212> TYPE: DNA
<213> ORGANISM: Artificial Sequence
<220> FEATURE:
<223> OTHER INFORMATION: Synthesized

<400> SEQUENCE: 95
gacgccacgt ggga                                                             14

<210> SEQ ID NO 96
<211> LENGTH: 202
<212> TYPE: DNA
<213> ORGANISM: Artificial Sequence
<220> FEATURE:
<223> OTHER INFORMATION: Synthesized

<400> SEQUENCE: 96
gaaattgacg agcattgatg tcttcgaaac cgttttttga actcctttcg ccaccatgcg           60
acgttttcta ccttttcctc ctcccgcggc ggctcctgcc ggaagcatag gcagtgaaga          120
gagagggaca ggtttgggcg accgagacga tgttggtgac ggattttgcg tcgttgtcgt          180
cgtgtaaact ctgattccga cg                                                  202

<210> SEQ ID NO 97
<211> LENGTH: 24
<212> TYPE: DNA
<213> ORGANISM: Artificial Sequence
<220> FEATURE:
<223> OTHER INFORMATION: Synthesized

<400> SEQUENCE: 97
cagctgagat gaacgagttg tctt                                                  24

<210> SEQ ID NO 98
<211> LENGTH: 24
<212> TYPE: DNA
<213> ORGANISM: Artificial Sequence
<220> FEATURE:
```

<223> OTHER INFORMATION: Synthesized

<400> SEQUENCE: 98
tcttttgagt cactccgtat gtcc                                              24

<210> SEQ ID NO 99
<211> LENGTH: 28
<212> TYPE: DNA
<213> ORGANISM: Artificial Sequence
<220> FEATURE:
<223> OTHER INFORMATION: Synthesized

<400> SEQUENCE: 99
ataataacgc tgcggacatc tacatttt                                          28

<210> SEQ ID NO 100
<211> LENGTH: 20
<212> TYPE: DNA
<213> ORGANISM: Artificial Sequence
<220> FEATURE:
<223> OTHER INFORMATION: Synthesized

<400> SEQUENCE: 100
tatcctacta atttaccaca                                                   20

<210> SEQ ID NO 101
<211> LENGTH: 20
<212> TYPE: DNA
<213> ORGANISM: Artificial Sequence
<220> FEATURE:
<223> OTHER INFORMATION: Synthesized

<400> SEQUENCE: 101
tctcctttac caaatactga                                                   20

<210> SEQ ID NO 102
<211> LENGTH: 24
<212> TYPE: DNA
<213> ORGANISM: Artificial Sequence
<220> FEATURE:
<223> OTHER INFORMATION: Synthesized

<400> SEQUENCE: 102
actgcttagg atattaactg accc                                              24

<210> SEQ ID NO 103
<211> LENGTH: 21
<212> TYPE: DNA
<213> ORGANISM: Artificial Sequence
<220> FEATURE:
<223> OTHER INFORMATION: Synthesized

<400> SEQUENCE: 103
ttttggcaca tcgacaccaa g                                                 21

<210> SEQ ID NO 104
<211> LENGTH: 16
<212> TYPE: DNA
<213> ORGANISM: Artificial Sequence
<220> FEATURE:
<223> OTHER INFORMATION: Synthesized

<400> SEQUENCE: 104
tatcctacta atttac                                                       16

```
<210> SEQ ID NO 105
<211> LENGTH: 11
<212> TYPE: DNA
<213> ORGANISM: Artificial Sequence
<220> FEATURE:
<223> OTHER INFORMATION: Synthesized

<400> SEQUENCE: 105 aagggggaaaa a                                                            11

<210> SEQ ID NO 106
<211> LENGTH: 10
<212> TYPE: DNA
<213> ORGANISM: Artificial Sequence
<220> FEATURE:
<223> OTHER INFORMATION: Synthesized

<400> SEQUENCE: 106
tatcctacta                                                               10

<210> SEQ ID NO 107
<211> LENGTH: 11
<212> TYPE: DNA
<213> ORGANISM: Artificial Sequence
<220> FEATURE:
<223> OTHER INFORMATION: Synthesized

<400> SEQUENCE: 107
tttggtaaag g                                                             11

<210> SEQ ID NO 108
<211> LENGTH: 12
<212> TYPE: DNA
<213> ORGANISM: Artificial Sequence
<220> FEATURE:
<223> OTHER INFORMATION: Synthesized

<400> SEQUENCE: 108
tactaattta cc                                                            12

<210> SEQ ID NO 109
<211> LENGTH: 10
<212> TYPE: DNA
<213> ORGANISM: Artificial Sequence
<220> FEATURE:
<223> OTHER INFORMATION: Synthesized

<400> SEQUENCE: 109
tatttggtaa                                                               10

<210> SEQ ID NO 110
<211> LENGTH: 11
<212> TYPE: DNA
<213> ORGANISM: Artificial Sequence
<220> FEATURE:
<223> OTHER INFORMATION: Synthesized

<400> SEQUENCE: 110
actaatttac c                                                             11

<210> SEQ ID NO 111
<211> LENGTH: 11
<212> TYPE: DNA
<213> ORGANISM: Artificial Sequence
<220> FEATURE:
<223> OTHER INFORMATION: Synthesized
```

```
<400> SEQUENCE: 111
gtatttggta a                                                        11

<210> SEQ ID NO 112
<211> LENGTH: 12
<212> TYPE: DNA
<213> ORGANISM: Artificial Sequence
<220> FEATURE:
<223> OTHER INFORMATION: Synthesized

<400> SEQUENCE: 112
tactaattta cc                                                       12

<210> SEQ ID NO 113
<211> LENGTH: 11
<212> TYPE: DNA
<213> ORGANISM: Artificial Sequence
<220> FEATURE:
<223> OTHER INFORMATION: Synthesized

<400> SEQUENCE: 113
gtatttggta a                                                        11
```